United States Patent
Legg et al.

(10) Patent No.: US 11,296,761 B2
(45) Date of Patent: Apr. 5, 2022

(54) WIRELESS COMMUNICATION FOR VEHICLE BASED NODE

(71) Applicant: BluWireless Technology Limited, Bristol (GB)

(72) Inventors: Peter Jonathon Legg, Bristol (GB); James Simon Pascoe, Bristol (GB); Oliver McConnell, Bristol (GB); David John Purle, Bristol (GB); Richard Michael Procter Graham, Bristol (GB)

(73) Assignee: BluWireless Technology Limited, Bristol (GB)

( * ) Notice: Subject to any disclaimer, the term of this patent is extended or adjusted under 35 U.S.C. 154(b) by 20 days.

(21) Appl. No.: 16/994,747

(22) Filed: Aug. 17, 2020

(65) Prior Publication Data
US 2022/0052731 A1    Feb. 17, 2022

(51) Int. Cl.
*H04B 7/06*      (2006.01)
*H04W 76/15*    (2018.01)
(Continued)

(52) U.S. Cl.
CPC .......... *H04B 7/0608* (2013.01); *H04B 7/022* (2013.01); *H04B 7/0408* (2013.01);
(Continued)

(58) Field of Classification Search
CPC ..... H04W 76/15; H04W 76/14; H04W 76/18; H04W 76/19; H04W 72/046; H04W 72/0453; H04W 36/18; H04W 36/16; H04W 36/03; H04W 36/04; H04W 36/06; H04W 36/08; H04W 36/10; H04W 36/12; H04B 7/0608; H04B 7/0695; H04B 7/022;
(Continued)

(56) References Cited

U.S. PATENT DOCUMENTS 9,036,563 B2 * 5/2015 Wang .................. H04W 72/085
370/329
10,348,394 B1 * 7/2019 Bakr ..................... H04B 7/2041
(Continued)

FOREIGN PATENT DOCUMENTS

AU    2013327697 A1 * 4/2015 ............. H04B 7/024
EP      3579443 A1 * 12/2019 .............. H04W 4/46
(Continued)

*Primary Examiner* — Phong La
(74) *Attorney, Agent, or Firm* — Optimus Patents US, LLC

(57) ABSTRACT

A communication system supports communication between an end node (101) of a vehicle (103) and a remote correspondent node (105) via a fixed network (107) which comprises a plurality of wireless access points (109) with a directional antenna arrangement for mm wave radio communication using directional beams. A vehicle (103) comprises wireless modems (111, 113, 701, 703) employing electronically steerable beamforming directional antennas for establishing mm wave radio communication links to the access points (109). The wireless modems (111, 701) forms links to two different access points (109). A ink manager (1101) is arranged to terminate a second mm wave radio communication link in response to a link failure a first mm wave radio communication link, and to initialize setup of a third mm wave radio communication link in response to the termination of the second mm wave radio communication link.

17 Claims, 17 Drawing Sheets

(51) Int. Cl.
    *H04B 7/022*      (2017.01)
    *H04B 7/0408*     (2017.01)
    *H04W 36/18*      (2009.01)
    *H04W 72/04*      (2009.01)

(52) U.S. Cl.
    CPC .......... *H04B 7/0695* (2013.01); *H04W 36/18* (2013.01); *H04W 72/046* (2013.01); *H04W 76/15* (2018.02)

(58) Field of Classification Search
    CPC ...... H04B 7/0408; H04B 7/04; H04B 7/0602; H04B 7/06
    See application file for complete search history.

(56) References Cited

U.S. PATENT DOCUMENTS

| | | | |
|---|---|---|---|
| 10,812,125 B1* | 10/2020 | Badic | H04B 7/0874 |
| 2019/0319686 A1 | 10/2019 | Chen | |
| 2020/0112360 A1* | 4/2020 | Krunz | H04B 7/088 |
| 2020/0196216 A1 | 6/2020 | Hui | |
| 2020/0229206 A1* | 7/2020 | Badic | H04W 4/023 |
| 2020/0335866 A1* | 10/2020 | Wang | H01Q 3/34 |
| 2021/0105092 A1* | 4/2021 | Hajimiri | H04B 7/0697 |
| 2021/0127403 A1* | 4/2021 | Ryu | H04W 72/046 |
| 2021/0135728 A1* | 5/2021 | Raghavan | H04W 24/10 |
| 2021/0150458 A1* | 5/2021 | Robinson | G08G 5/0069 |
| 2021/0336815 A1* | 10/2021 | Das | H04L 12/2801 |

FOREIGN PATENT DOCUMENTS

| | | | | |
|---|---|---|---|---|
| WO | 2019120479 A1 | 6/2019 | | |
| WO | WO-2020109997 A1 * | 6/2020 | ............ | H04W 76/19 |

* cited by examiner

WIRELESS COMMUNICATION FOR VEHICLE BASED NODE

FIELD OF THE INVENTION

The invention relates to support of communication with a vehicle based node, and in particular, but not exclusively, to wireless communication for a node on a train.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers' (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5 GHz band. One variant is known as IEEE 802.11ad and this further expands the standard to support communications in the 60 GHz band.

A particularly difficult challenge for a communication infrastructure is to support mobility. In particular, it is difficult to provide high data rate support for fast moving vehicles, for example in order to support high capacity Internet access on board trains.

Conventional Wi-Fi systems allow handovers between different access points and accordingly provide some mobility support. However, the handovers and general mobility support tend to be relatively slow (with an interruption in data connectivity) and relatively complex and tend to not be suitable for faster moving mobile stations, such as fast-moving vehicles. Traditional Wi-Fi access points also tend to be limited to a relatively low capacity/throughput.

Another approach is to use cellular communication systems that are inherently developed to support mobility. However, such systems tend to have large cells and to be restricted to much lower capacity and throughput speed than desired.

A general problem is that in order to support high capacity communication with, in particular, a fast moving vehicle, a significant amount of air interface resource (spectrum) is required, and this tends to restrict the capacity that can be provided by many existing systems in the most frequently used frequency ranges. This in particular applies to both cellular and Wi-Fi based wireless communication systems. It is therefore desirable to exploit less used frequency bands and there is substantial interest in providing high capacity support of fast moving vehicles using millimeter-wave (mm) wavelength based communication, such as specifically the 60 GHz frequency band. However, the mobility challenges known from e.g. Wi-Fi systems become even more significant. For example, for 60 GHz communications, the radio communication link is directional and heavily dependent on the specific current conditions, such as distance, line of sight, etc. For a fast moving vehicle this results in an increased number of handovers and in continuously fast changing conditions. Whilst some direction changes can be accommodated by steering the antennae of the radio communication link, there is not the omnidirectional capability of typical cellular and Wi-Fi radios.

In general, the efficient usage of the air interface in mm wave communication and with potentially fast-moving vehicles is a difficult challenge to address. This challenge is further exacerbated by the desire to provide this function in communication systems that are compatible with many existing network techniques and principles, such as Internet Protocol based routing, existing network-based mobility functions etc. However, most approaches for supporting communication for in particular fast moving vehicles tend to be suboptimal.

A particularly critical issue is that of how to control the dynamic formations and terminations of mm wave radio communication links between access points and wireless modems such that the overall communication capacity and air interface resource is optimized as much as is possible. This is a very difficult problem for mm wave radio communication links and fast changing conditions as occur for (fast) moving vehicles.

Hence, an improved approach for supporting communication with moving vehicles via mm wave radio communication links would be advantageous. In particular, an approach that allows improved operation, improved reliability, increased flexibility, facilitated implementation, facilitated operation, improved resource utilization and in particular air interface resource utilization, improved handover performance, increased over the air communication capacity, improved performance and/or improved support for communication with vehicles would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention, there is provided a communication system for supporting communication between an end node of a vehicle and a remote correspondent node via a fixed network, the communication apparatus comprising: a plurality of wireless access points of the fixed network, each wireless access point having a directional antenna arrangement for mm wave radio communication using directional beams; a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links; wherein a first wireless modem of the plurality of wireless modems is arranged to establish a first mm wave radio communication link to a first access point of the plurality of access points using a first main beam being directed in a forward direction for the vehicle; a second wireless modem of the plurality of wireless modems is arranged to establish a second mm wave radio communication link to a second access point of the plurality of access points using a second main beam being directed in a rearward direction for the vehicle; and the communication system further comprises: a link manager arranged to terminate the second mm wave radio communication link in response to a link failure for first mm wave radio communication link, and to initialize setup of a third mm wave radio communication link between the second wireless modem and a candidate access point in response to the termination of the second mm wave radio communication link.

The invention may provide improved and/or facilitated operation and/or improved performance for a beamform based mm wave radio communication system supporting (potentially fast) moving vehicles. The approach may, in particular, provide efficient and reliable communication and may in many embodiments provide improved utilization of the available air interface resource. The approach may in many embodiments provide improved consistency and reduced data interruption and/or performance degradation.

The use of beams from directional antennas may specifically support radio communication links from different wireless modems of the vehicle to the same access point or to different access points. It may allow steering of the beams towards the same or different access points thereby enabling or improving multiple links between the vehicle and access points. This may provide improved performance.

The wireless modems, controller, and/or end node may be in/on/attached to/move with etc. the vehicle, and may be part of a mobile network that moves with the vehicle.

The first main beam is formed by an electronically steerable beamforming directional antenna of the first wireless modem. The electronically steerable beamforming directional antenna of the first wireless modem may be arranged to only form main beams in a forward direction.

The second main beam is formed by an electronically steerable beamforming directional antenna of the second wireless modem. The electronically steerable beamforming directional antenna of the second wireless modem may be arranged to only form main beams in a rearward direction.

The third mm wave radio communication link between the second wireless modem and a candidate access point may be using a main beam being directed in a rearward direction for the vehicle. The main beam may be formed by the electronically steerable beamforming directional antenna of the second wireless modem A forward direction may be a direction (vector) that has a positive dot product with a direction of movement/travel (vector) for the vehicle or the velocity (vector) of the vehicle. The forward direction may be a direction within a 180° interval centered on a direction of forward movement/travel. In some embodiments, the forward direction may be within a more limited interval, such as within a 45°, 60°, 75° or 90° interval centered on the direction of movement/travel.

The forward direction of movement/travel may be a nominal direction corresponding to a nominal forward direction for the vehicle. Typically, vehicles such as trains, cars, busses, lorries, boats etc. are designed to have a nominal forward direction. The nominal forward direction may be a nominal (forward) direction of travel. The nominal (forward) direction of travel may typically be a direction of travel of the center of the vehicle for a range of forward directions of travel possible by the vehicle.

A rearward direction may be a direction (vector) that has a negative dot product with a direction of movement/travel (vector) for the vehicle or the velocity (vector) of the vehicle. The rearward direction may be a direction within a 180° interval centered on a direction opposite of forward movement/travel. In some embodiments, the rearward direction may be within a more limited interval, such as within a 45°, 60°, 75° or 90° interval centered on the direction opposite of movement/travel.

The rearward direction of movement/travel may be a nominal direction corresponding to a nominal rearward direction for the vehicle. Typically, vehicles such as trains, cars, busses, lorries, boats etc. are designed to have a nominal rearward direction. The nominal rearward direction may be opposite to a nominal direction of travel.

A link failure may be detected when a link quality falls below a threshold. The link failure for a link may be detected in response to a quality measure for the link meeting a criterion indicative of the link quality not being acceptable/sufficient to maintain the link. A link failure may occur when a link is not capable of supporting communication between the wireless modem and access point. A link failure for a link may occur if the capacity of the link falls below a threshold. A link failure may occur when a number of consecutive beacon transmissions, data channel, or control channel transmissions cannot be received correctly. A link failure may occur if the received power or signal strength of a link falls below a threshold.

In some embodiments, the link manager may be arranged to terminate the second mm wave radio communication link in response to a detection that the first mm wave radio communication link is terminated due to a reduction in link quality for the first mm wave radio communication link.

The link management is located on the vehicle.

In some embodiments, the link manager is arranged to terminate the second mm wave radio communication link and initialize setup of a third mm wave radio communication link between the second wireless modem and a candidate access point in response to a detection that the first mm wave radio communication link is terminated.

In some embodiments, the link manager may be arranged to terminate the second mm wave radio communication link dependent on whether a mm wave radio communication link has been formed between the first wireless modem and an access point of the plurality of access points.

In some embodiments, the link manager may be arranged to terminate the second mm wave radio communication link only if a (new) mm wave radio communication link has been established between the first wireless modem and an access point of the plurality of access points (following the link failure).

According to an optional feature of the invention, the link manager is arranged to initialize the third mm wave radio communication link by initializing a scanning for access points by the second wireless modem.

A scanning for access points may include searching for transmissions from different access points. The searching for transmissions may be used to detect access points that can support setup of a mm wave radio communication link. The detection may include a determination of a radio propagation measure for an access point from which a transmission is detected. An access point may be considered to be able to support setup of a mm wave radio communication link if the radio propagation measure for the access point meets a criterion, such as specifically a radio propagation quality criterion. The scanning may include a search over a plurality of transmission channels. At least some of the transmission channels may have different frequency bands and/or time intervals and/or code division codes and/or identifiers.

According to an optional feature of the invention, the link manager is arranged to select the candidate access point as an access point linked to the first access point.

This may provide improved performance in many embodiments and scenarios. It may allow for a more reliable link formation to an access point suitable for supporting future communication.

At least some of the plurality of access points may be divided into sets of access points. In some embodiments, the access points belonging to the same set may be linked. A set of access points may comprise/consist in colocated access points. The link manager may be arranged to select the candidate access point as an access point belonging to a same set as the first access point.

In some embodiments, the link manager may be arranged to select the candidate access point as an access point (designated/indicated to be) substantially co-located with the first access point.

According to an optional feature of the invention, the candidate access point is colocated with the first access point.

This may provide improved performance in many embodiments.

According to an optional feature of the invention, the candidate access point and the first access point are arranged to form directional beams in different directions.

This may provide improved performance in many embodiments.

In some embodiments, the candidate access point and the first access point have different coverage areas.

In some embodiments, the candidate access point and the first access point may be arranged to form directional beams in (intervals in) opposite directions of a predetermined route.

According to an optional feature of the invention, the candidate access point is a different access point than the first access point and the second access point.

According to an optional feature of the invention, the link manager is arranged to start a timer on detection of the link failure and to terminate the second mm wave radio communication link when the timer exceeds an expiry time.

In some embodiments, the link manager may be arranged to start a timer on detection of link failure and to terminate the second mm wave radio communication link when a time determined by the timer exceeds a first duration/delay.

According to an optional feature of the invention, the link manager is arranged to stop the timer in response to a detection that a link between the first wireless modem and the first access point is re-established.

According to an optional feature of the invention, the expiry time is no less than 5 msec and no more than 10 seconds.

According to an optional feature of the invention, the link manager is arranged to adapt the expiry time in response to a speed indication for the vehicle.

According to an optional feature of the invention, the link manager is arranged to adapt the expiry time in response to at least one of a beam form property for the electronically steerable beamforming directional antennas of the second wireless modem and a beam form property for the electronically steerable beamforming directional antennas of the first wireless modem.

According to an optional feature of the invention, the link manager is arranged to adapt the expiry time in response to at least one of a beam form property for the directional antenna arrangement of the first access point and a beam form property for the directional antenna arrangement of the candidate access point.

According to an optional feature of the invention, the link manager 1001 is arranged to adapt the expiry time in response to a spatial relationship between the first access point and a predetermined route for the vehicle.

According to an optional feature of the invention, an electronically steerable beamforming directional antenna of the first wireless modem is restricted to forming a beam within an angular interval not exceeding 180°.

The angular interval may specifically be an interval for an azimuth angle.

According to an optional feature of the invention, the vehicle is arranged to move along a predetermined route.

According to an aspect of the invention, there is provided a method of operation for a communication system for supporting communication between an end node of a vehicle and a remote correspondent node via a fixed network, the communication system comprising: a plurality of wireless access points of the fixed network, each wireless access point having a directional antenna arrangement for mm wave radio communication using directional beams; a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links; wherein a first wireless modem of the plurality of wireless modems is arranged to establish a first mm wave radio communication link to a first access point of the plurality of access points using a first main beam being directed in a forward direction for the vehicle; a second wireless modem of the plurality of wireless modems is arranged to establish a second mm wave radio communication link to a second access point of the plurality of access points using a second main beam being directed in a rearward direction for the vehicle; and the method comprises: terminating the second mm wave radio communication link in response to a link failure for first mm wave radio communication link, and initializing setup of a third mm wave radio communication link between the second wireless modem and a candidate access point in response to the termination of the second mm wave radio communication link.

According to an aspect of the invention, there is provided an apparatus for a communication system for supporting communication between an end node of a vehicle and a remote correspondent node via a fixed network, the communication system comprising: a plurality of wireless access points of the fixed network, each wireless access point having a directional antenna arrangement for mm wave radio communication using directional beams; a plurality of wireless modems arranged to establish mm wave radio communication links to wireless access points of the plurality of wireless access points, the mm wave radio communication links supporting a data session between the end node and the remote correspondent node, the plurality of wireless modems being located on the vehicle and employing electronically steerable beamforming directional antennas for establishing the mm wave radio communication links; wherein a first wireless modem of the plurality of wireless modems is arranged to establish a first mm wave radio communication link to a first access point of the plurality of access points using a first main beam being directed in a forward direction for the vehicle; a second wireless modem of the plurality of wireless modems is arranged to establish a second mm wave radio communication link to a second access point of the plurality of access points using a second main beam being directed in a rearward direction for the vehicle; and the apparatus comprising: a link manager arranged to terminate the second mm wave radio communication link in response to a link failure for first mm wave radio communication link, and to initialize setup of a third mm wave radio communication link between the second wireless modem and a candidate access point in response to the termination of the second mm wave radio communication link.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
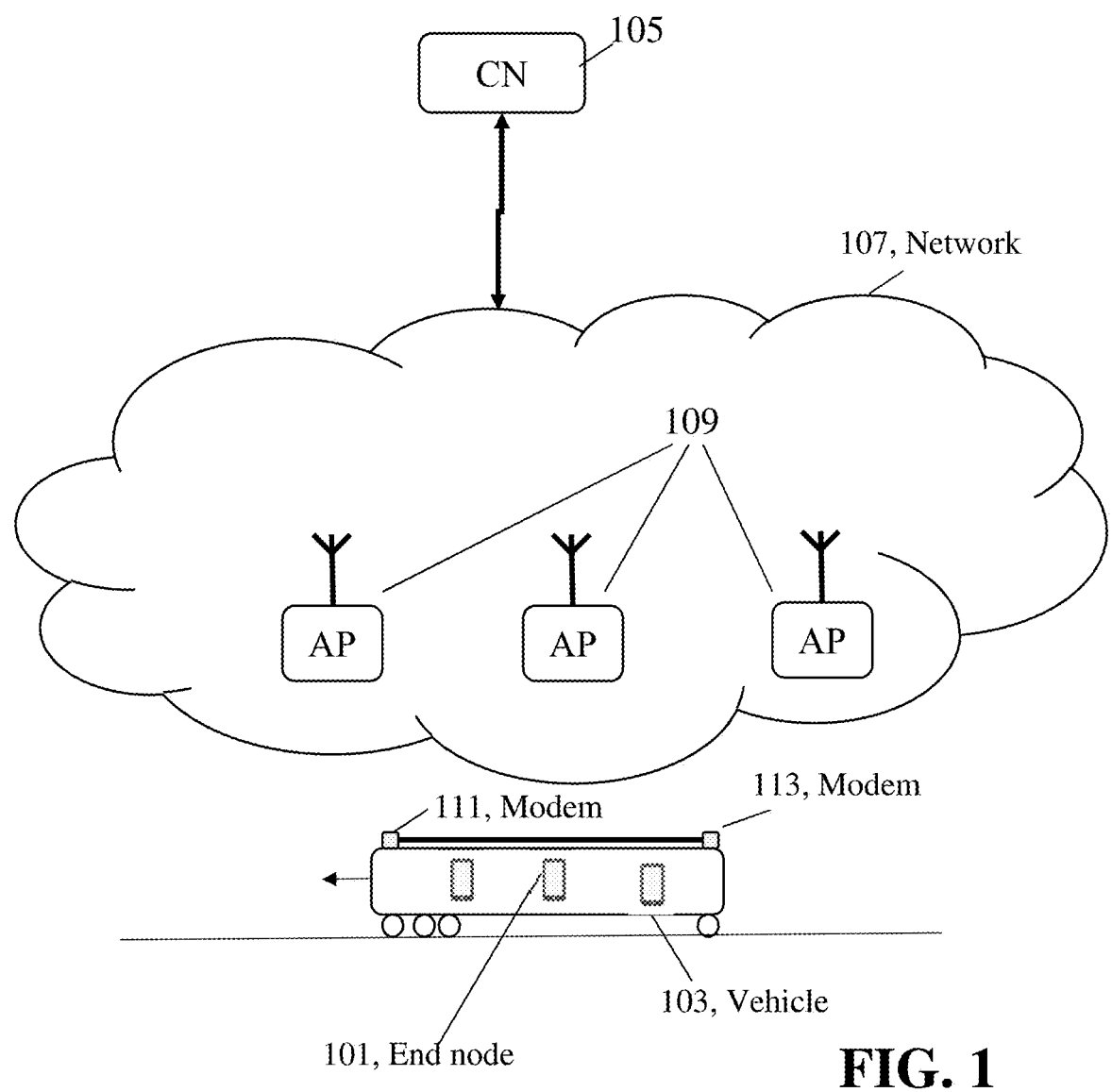
FIG. 1 illustrates an example of elements of a wireless communication system in accordance with some embodiments of the invention.

FIG. 1 illustrates an example of elements of a communication system which supports communication with end nodes that are located in moving vehicles, and in particular in fast moving vehicles such as cars, boats, buses, and trains. The following description will focus on an example in which the vehicle is a train, but it will be appreciated that in other embodiments the end node may be part of other vehicles, such as e.g. a bus driving on a motorway.

In the example of FIG. 1, a communication/data session is established between a correspondent node 105 and an end node 101 located in a train/vehicle 103. It will be appreciated that references to an entity being at/with/in/on etc. a vehicle includes any physical or logical form of the vehicle and entity being substantially co-moving, including the entity being positioned on, attached to, embedded within, etc. the vehicle. It will also be appreciated that it does not require the entity to be immovable with respect to the vehicle but rather it may include, for example, an entity being manually moved by a person (such as a person carrying a mobile device comprising the end node 101). An entity being in a vehicle may include all scenarios wherein the movement of the entity is at least partially dependent on the movement of the vehicle/where the movement of the vehicle imparts a movement on the entity.

The correspondent node 105 may be any communication node/service, and indeed may itself be a mobile node, or a node located in a vehicle. The following description will consider a scenario wherein the correspondent node 105 is a server supporting a corresponding client operating on the end node 101, and specifically a World Wide Web application will be considered where the correspondent node 105 is a web server supporting a web browser on the end node 101 accessing an Internet site supported by the web server of the corresponding node 105.

The communication/data session is supported by a fixed network 107 which may specifically be a complex network comprising routers, switches, management nodes, mobility controllers, modems etc. as will be known to the skilled person. In the example, the fixed network 107 is a Wide Area Network, WAN, based on the Internet Protocol (IP).

The correspondent node 105 is coupled to the fixed network 107 through a communication connection which supports the data session with the end node 101. The communication connection is in the example an IP connection and may be established using any suitable means, such as e.g. by a direct connection of a device comprising the corresponding node 105 to a node of the fixed network or e.g. it may be a connection which is provided by a network coupled to both the fixed network 107 and the corresponding node 105. The network may in particular be the Internet, and the coupling of the correspondent node 105 to the fixed network 107 may be via an Internet connection. It will also be appreciated that the fixed network 107 itself may be considered fully or partially part of the Internet and/or that the Internet may form part of the fixed network 107.

It will be appreciated that although FIG. 1 (and the following) figures focusses on description of communication for one end node, the system will typically support simultaneous communication for a large number of end nodes and in many embodiments, the combined data rate for communication to/from the vehicle may be in the order of several tens or even hundreds of Gigabit per second.

The coupling of the fixed network 107 to nodes on the train 103 is supported by wireless radio communication links. For this purpose, the fixed network 107 comprises a plurality of wireless access points (APs) 109 which in the specific example may be a relatively large number of stationary access points e.g. positioned along train tracks to support communication for a train.

Correspondingly, the train/vehicle 103 comprises a plurality of wireless modems 111, 113 which are arranged to establish wireless (radio) communication links with the access points 109. The wireless modems 111, 113 are further arranged to establish one or more connections with the end node 101. The wireless modems 111, 113 are accordingly located at (in/on etc.) the train and are arranged to communicate with the access points 109 in order to provide an interface between the vehicle network nodes and entities (and specifically the end node 101) and the fixed network 107.

In the specific embodiment, the wireless radio links between the wireless modems 111, 113 and the access points 109 are formed using relatively high radio frequencies, and specifically mm wave radio communication is used. For example, the wireless links may be formed by radio communications using the 60 GHz frequency band. mm wave communications may specifically be communication in the 20 GHz to 300 GHz frequency range.

The wireless modems 111, 113 are in the example individual nodes in the network configuration and have individual MAC addresses. Data packets can be addressed to the individual modems by other network entities, such as routers or switches, using the individual MAC addresses. A communication link is established from an access point 109 to a wireless modem 111 using the MAC addresses of the AP 109 and the modem 111, and similarly for a link to modem 113 but using the MAC address of modem 113.

In a specific embodiment of using the IEEE 802.11ad wireless technology, the AP and the two modems would form a BSS (basic service set). A scheduler may accordingly allocate data packets to an individual link by associating them with the appropriate MAC address. In particular, each AP may comprise a MAC layer scheduler which performs scheduling of date over the air interface of the AP based on MAC addresses. In many systems, the scheduling is based on a TDMA scheduling allocating time intervals/slots for individual air interface links (in some embodiments allocation may be in fixed duration time slots but in other systems allocation may be in variable duration time slots or intervals).

Radio communications at higher frequencies tend to be more suited for shorter distances and using direct line of sight propagation. Directional beams are employed to increase the link distance, but the maximum distance for the wireless links tends to be relatively limited and each access point 109 will typically only cover a relatively short distance or interval. For example, for a 60 GHz system supporting a train, the coverage from each access points 109 may practically be restricted to e.g. around 300 m to 1 km from the access points 109. Accordingly, the distance between access points 109 will tend to be relatively small with the result that a relatively large number of access points 109 will be employed. For example, along a railway track, access points may be distributed for each, e.g. 500 m–1 km of track.

As a consequence, the radio conditions will tend to change quickly for the wireless modems 111, 113, and specifically the optimum access points 109 to which to connect tend to change quickly, e.g. for a train moving along train tracks at a potentially high speed. Furthermore, the directional radio beam of the wireless modems 111, 113 cannot necessarily be steered over all directions, but may be limited to e.g. a 90 degree range in the horizontal (azimuth) plane. In order to support such scenarios, the system supports handovers between different access points 109 such that a connection from an end node 101 to the fixed network 107 (and the correspondent node 105) can be sequentially supported by different access points 109 and modems 111, 113 as the vehicle/train 103 moves. In order to maximize the separation of the access points, an individual modem can lose connectivity for significant periods of time (for example, it may only be connected to an AP for approximately half of the time), but the connectivity to the vehicle from at least one modem at any one point in time can be maintained.

It is desirable for such handovers to be seamless to the end node 101 such that the communication and the supported service is not interrupted. It is specifically desirable to establish new access point connections before terminating the previous ones (also known as make before break handovers).

However, supporting mobile communications, and, in particular, in situations where the wireless scenario experienced by the mobile unit changes quickly requiring many and frequent handovers, is a very difficult and challenging problem. The challenge tends to be exacerbated for communication systems and networks, such as IP networks, that are not originally designed to support such mobility.

The system of FIG. 1 is arranged to provide efficient and high-performance mobility support for end nodes of a vehicle, such as specifically for end nodes that are comprised in e.g. handheld devices of passengers on a fast moving train.

Figure 2:
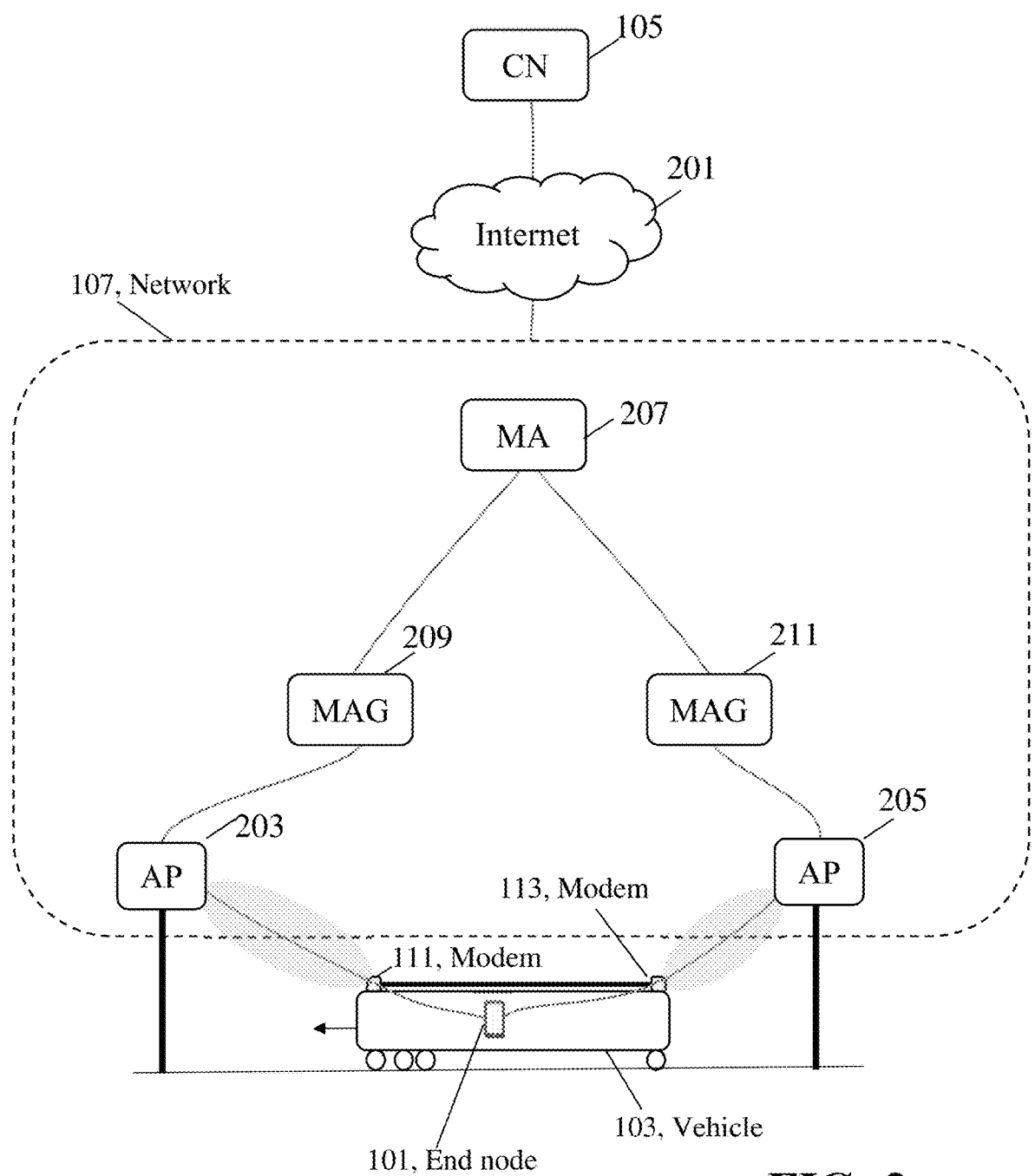
FIG. 2 illustrates an example of elements of a wireless communication system in accordance with some embodiments of the invention.

FIG. 2 which shows an example of a specific scenario of FIG. 1 in which an end node 101 in a train 103 communicates with a correspondent node 105.

In the specific example, the correspondent node 105 is coupled to the fixed network 107 via a connection of the Internet 201 (it will be appreciated that the fixed network 107, as indeed the wireless modems 111, 113, may be considered fully or partially part of the Internet).

FIG. 2 illustrates a specific situation in which the train 103 has simultaneous access to a first access point 203 and a second access point 205 of the access points 109 via a pair of wireless modems of the wireless modems 111, 113. In the specific situation, one wireless modem 111 has established a wireless link with the first access point 203 and another wireless modem 113 has established a wireless link with the second access point 205.

The end node 101 and corresponding node 103 have established a data session which is supported by the fixed network 107. For example, the correspondent node 105 may operate a web server providing a web service to a client running on a device implementing the end node 101. As a specific example, a passenger on the train may operate a web browsing application which operates a web browsing client that initiates and supports a web service provided by the correspondent node 105.

The fixed network 107 provides connections that can be used by the client and the server. In order to support the mobility of the fast moving train, the fixed network 107 may in some examples comprise a mobility anchor (MA) 207 which operates as a fixed anchor for the mobile nodes of the train 103. Specifically, the mobility anchor 207 operates as a common fixed anchor in the fixed network 107 for all the wireless modems 111, 113 of the train 103.

The mobility anchor 207 may provide a common node for all connections and communication paths from the correspondent node 105 to the end node 101 regardless of which of the access points 109 and wireless modems 111, 113 support the communication.

Accordingly, all data from the correspondent node 105 to the end node 101 for the data session may be routed via the mobility anchor 207 regardless of the wireless link that is used on the air interface between the access points 109 and the train. This may for example be achieved by the mobility anchor 207 advertising that it is a mobility anchor 207 for the wireless modems 111, 113 (or other nodes on the train 103) such that any datagrams addressed to any of these nodes will be routed to the mobility anchor 207.

Similarly, all data from the end node 101 to the correspondent node 105 for the data session may be routed via the mobility anchor 207 regardless of the wireless link that is used on the air interface between the access points 109 and the train 103.

The system may accordingly operate a mobility anchor functionality which provides a fixed anchor point for the mobile nodes of the train 103. The mobility anchor 207 will perform mobility management which includes keeping track of which access points 109 the wireless modems 111, 113 are currently connected to, and updating the routing path for the individual wireless modems 111, 113 and the end node 101 when conditions change. Thus, when the train moves and the individual modems dynamically switch/handover to different access points 109, the mobility anchor 207 will register the resulting changes and update the communication path for the individual connection/flow.

In the example of FIG. 2, each of the access points 203, 205 is coupled to a Mobile Access Gateway 209, 211. Each Mobile Access Gateway 209, 211 is typically linked with a plurality but not all of the access points 203, 205. Indeed, each MAG 209, 211 may be associated with a different segment of the network.

The mobility anchor 207 is accordingly a common mobility anchor for a plurality of the wireless modems 111, 113 of the train 103, and typically for all of the wireless modems 111, 113.

In many practical systems, some or all of the access points 109, 203, 205 may be substantially colocated and coupled together through network entities that allow short routing paths between them.

Figure 3:
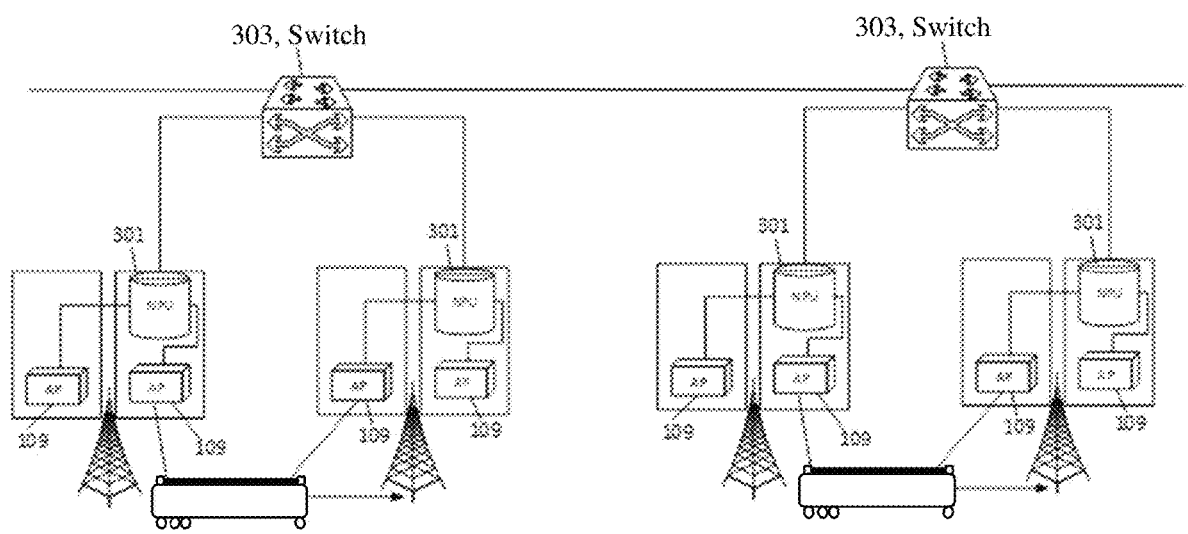
FIG. 3 illustrates an example of elements of a wireless communication system in accordance with some embodiments of the invention.

In many embodiments, such as e.g. illustrated by FIG. 3, two access points 109 may typically be colocated (e.g. on the same mast) with directional beams being used to provide coverage in different, and typically opposite directions.

The colocated access points 109 may often be coupled to each other and the rest of the fixed network 107 by a suitable network entity, such as a Network Processing Unit (NPU 301). The NPU 301 may for example allow easy routing of data from one access point to another, and may control whether data packets are routed between the end node and the fixed network via one or the other of the colocated access points 109.

Further, in many systems, the different access points 109 may be coupled together via switches or routers 303 that e.g. may provide a short and direct routing between access points 109 and NPUs 301. This may often facilitate routing and handovers when the vehicle moves as the required modification of routing can be reduced and localized to a higher degree. The switches or routers 303 may further connect to the rest of the fixed networks, e.g. through interface routers/switches 305.

Figure 4:
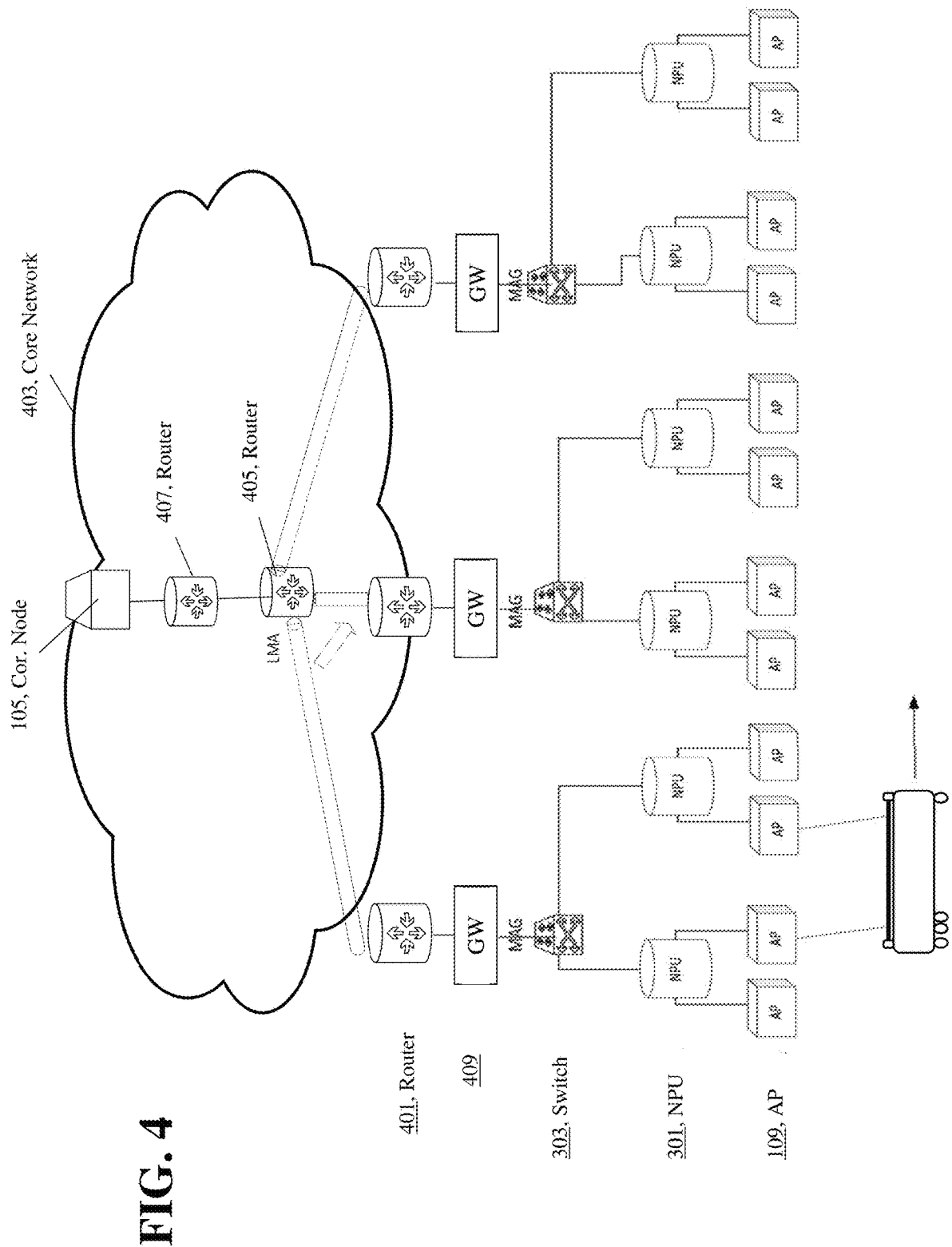
FIG. 4 illustrates an example of elements of a wireless communication system in accordance with some embodiments of the invention.

FIG. 4 illustrates a specific example of a possible network where pairs of access points 109 are colocated and supported by an NPU 301. A plurality of NPUs 301 may be coupled to a network switch 303 which may provide the MAG for that plurality of NPUs 301. Other network switches may support other access points 109 and provide a MAG for those access points 109.

In many embodiments, such a system of access points 109 and supporting network functions (e.g. switches and NPUs) may be proprietary and aimed at a specific scenario, such as supporting a train along a track. Such a proprietary system may accordingly provide a number of interface points with capability of providing a MAG function for the moving vehicle. The system may for example provide a proprietary access network that may be coupled to other networks via suitable interface connections and gateways.

For example, each of the interface points may be coupled to an edge router 401 of a core network 403 being part of the fixed network 107. The core network 403 may be a general non-proprietary network such as e.g. the Internet. In some embodiments, the MAG function may be provided in the edge router (or possibly another element of the core network). Another router 405 of the core network 403 may provide a MA (Mobility Anchor) function allowing routing of data to and from the MAG as appropriate. The correspondent node 105 may communicate with the MA through a suitable route, typically including a number of routers 407.

Figure 5:
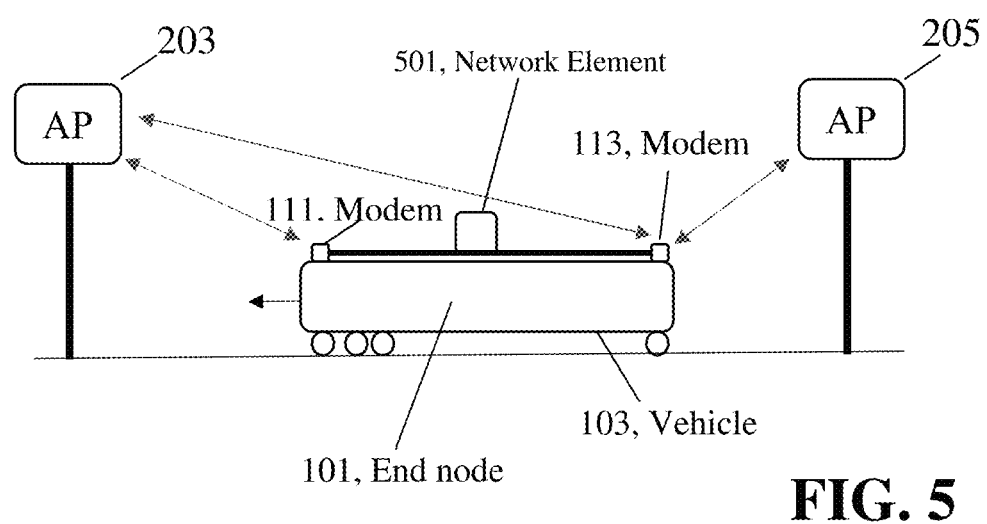
FIG. 5 illustrates an example of elements of a wireless communication system in accordance with some embodiments of the invention.

In some embodiments, the end node 101 may directly be connected to the wireless modems 111, 113 e.g. by a direct wireless link. However, in many embodiments, the wireless modems 111, 113 may as illustrated in FIG. 5 be coupled to a network element 501 or a network through which the connection with the end node 101 is formed. Thus, the wireless modems 111, 113 may be part of a vehicle network that supports communication for end nodes. The network may for example include IEEE 802.11 network elements and access points for the end nodes.

Figure 6:
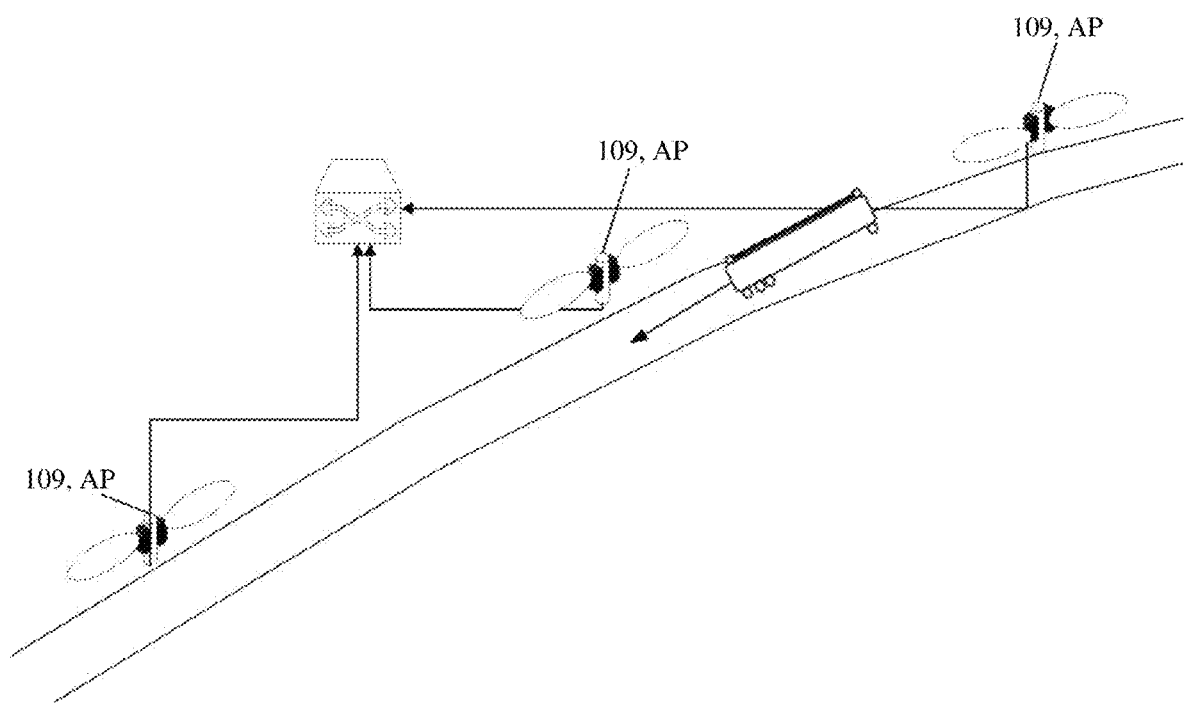
FIG. 6 illustrates an example of elements of a wireless communication system in accordance with some embodiments of the invention.

As previously mentioned, in many systems, the access points 109 may be arranged with a plurality of access points 109 being substantially colocated. For example, often pairs of access points 109 are colocated on a mast along the route covered. The access points 109 may use directional antenna arrangements to provide different coverage areas. For example, as illustrated in FIG. 6, two colocated access points 109 may have directional antenna beams that are substantially in opposite directions, and typically in different directions along a predetermined route such as in different directions along the track being covered (e.g. in opposite directions of the track or road being covered).

Thus, some or all of the access points 109 may comprise directional antennas which are arranged to steer beams towards the wireless modems of the vehicle. In some embodiments, a static beam forming may be used with the beam formed being constant in a given direction. For example, one access point 109 may permanently direct a beam down a track and another colocated access point 109 may permanently direct a beam up the track in the other direction. A vehicle downstream from the position may then be connected via a wireless link with the first access point 109 and a vehicle upstream from the position may then be connected via a wireless link with the second access point 109.

In many embodiments, the access points 109 may be arranged to dynamically and electronically steer the beams, and specifically may be arranged to steer them towards respectively the wireless modems. A beam may indeed by steered individually for each wireless link and may dynamically be updated to be directed towards the wireless modem supporting the link. The updating may for example be by updating antenna array coefficients in response to received parameters as well known in the art.

The beamforming of the directional antennas of the access points may in some embodiments allow for variations in the beam directions for the main beam. However, in many such embodiments, the beam directions may be limited to an interval, such as for example an azimuth interval with a range no larger than e.g. 180°, 135°, 90°, or even 45°.

In the examples previously described, two wireless modems 111, 113 were used to establish links between the vehicle/train 103 and the fixed network 107. The two wireless modems 111, 113 are in the examples positioned towards opposite ends of the vehicle/train 103. In some embodiments, the vehicle/train 103 may comprise more wireless modems and in particular it may in many embodiments be advantageous to have a plurality colocated wireless modems. This may specifically be advantageous if the colocated modems are arranged to form beams in different directions and/or freely/separately/independently of each other.

In particular, in many embodiments, rather than having a single wireless modem towards the front of the vehicle/train, there may be two wireless modems forming beams respectively in the rearward and in the rearward/backwards direction. Similarly, rather than having a single wireless modem towards the back of the vehicle/train, there may be two wireless modems forming beams respectively in the rearward and in the rearward direction. Thus, in such an example, there may be four links available such as e.g. often two links from respectively the front and the back of the vehicle/train pointing towards an access point ahead of the vehicle/train and two links from respectively the front and the back of the vehicle/train pointing towards an access point behind the vehicle/train. In some systems, there may be implemented a scheduling function which freely and dynamically can allocate data over the four different air interface links thereby allowing these to be fully optimized.

A forward direction may be a direction that has a positive dot product with a direction of movement/travel for the vehicle. The forward direction may be a direction within a 180° interval centered on a direction of forward movement/travel. In some embodiments, the forward direction may be within a more limited interval, such as within a 45°, 60°, or 75° interval centered on the direction of movement/travel.

The forward direction of movement/travel may be a nominal direction corresponding to a nominal forward direction for the vehicle. Typically, vehicles such as trains, cars, busses, lorries, boats etc. are designed to have a nominal forward direction. The nominal forward direction may be a nominal forward direction of travel. The nominal forward direction of travel may typically be a center direction of travel for a range of forward directions of travel possible by the vehicle.

A rearward direction may be a direction that has a negative dot product with a direction of movement/travel for the vehicle. The rearward direction may be a direction within a 180° interval centered on a direction opposite of forward movement/travel. In some embodiments, the rearward direction may be within a more limited interval, such as within a 45°, 60°, or 75° interval centered on the direction opposite of movement/travel.

The rearward direction of movement/travel may be a nominal direction corresponding to a nominal rearward direction for the vehicle. Typically, vehicles such as trains, cars, busses, lorries, boats etc. are designed to have a nominal rearward direction. The nominal rearward direction may be a nominal rearward direction of travel. The nominal rearward direction of travel may typically be a center direction of travel for a range of rearward directions of travel possible by the vehicle.

A forward direction may be a direction that has a positive dot product with a direction of movement/travel for the vehicle. The forward direction may be a direction within a 180° interval centered on a direction of forward movement/travel. In some embodiments, the forward direction may be within a more limited interval, such as within a 45°, 60°, or 75° interval centered on the direction of movement/travel.

The forward direction of movement/travel may be a nominal direction corresponding to a nominal forward direction for the vehicle. Typically, vehicles such as trains, cars, busses, lorries, boats etc. are designed to have a nominal forward direction. The nominal forward direction may be a nominal forward direction of travel. The nominal forward direction of travel may typically be a center direction of travel for a range of forward directions of travel possible by the vehicle.

A rearward direction may be a direction that has a negative dot product with a direction of movement/travel for the vehicle. The rearward direction may be a direction within a 180° interval centered on a direction opposite of forward movement/travel. In some embodiments, the rearward direction may be within a more limited interval, such as within a 45°, 60°, or 75° interval centered on the direction opposite of movement/travel.

The rearward direction of movement/travel may be a nominal direction corresponding to a nominal rearward direction for the vehicle. Typically, vehicles such as trains, cars, busses, lorries, boats etc. are designed to have a nominal rearward direction. The nominal rearward direction may be a nominal rearward direction of travel. The nominal rearward direction of travel may typically be a center direction of travel for a range of rearward directions of travel possible by the vehicle.

Figure 7:
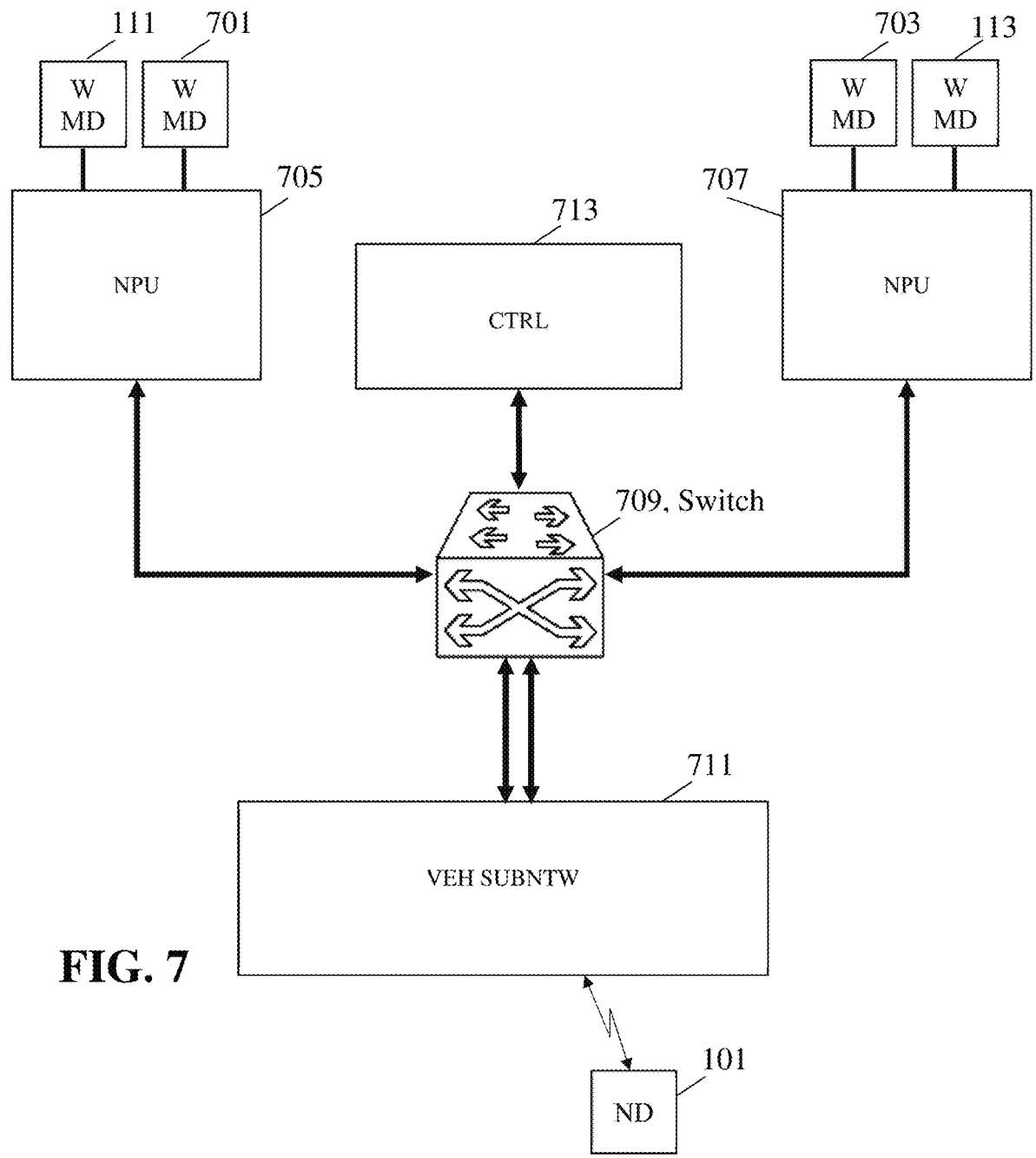
FIG. 7 illustrates an example of elements of a vehicle based network subsystem of a wireless communication system in accordance with some embodiments of the invention.

FIG. 7 illustrates an example of a vehicle network of the vehicle. The vehicle network may include all elements of the communication system which is located on the vehicle/moves with the vehicle.

In the example of FIG. 7, the vehicle network comprises four wireless modems 111, 113, 701, 703 being arranged into colocated pairs with one pair of colocated wireless modems 111, 701 being towards the front of the vehicle and the other pair of colocated wireless modems 113, 703 being located towards the rear of the vehicle.

The first pair of wireless modems 111, 701 are coupled to a first NPU 705 and the second pair of wireless modems 113, 703 are coupled to a second NPU 707. The NPUs 705, 707 are coupled to a switch 709 which is further coupled to a vehicle subnetwork 711 which supports end nodes on the vehicle such that these can interact with the remaining parts of the communication system. The vehicle subnetwork 711 provides access points to the end nodes on the vehicle and allow them to communicate with remote nodes of the fixed part of the communication system via the wireless modems 111, 113, 701, 703, It may in the example provide routes to the wireless modems via the switch 709 and NPUs 705, 709 but it will be appreciated that in other embodiments other configurations may be possible and the vehicle subnetwork 711 may directly be coupled to the wireless modems 111, 113, 701, 703. In the specific example, the NPUs 705, 707 and vehicle subnetwork 711 may specifically be coupled to the switch 709 via Ethernet connections and the switch 709 may be an Ethernet switch.

It will be appreciated that the vehicle subnetwork 711 may include and implement various other network functions including resource control, scheduling and allocation functions, routing adaptation, data session setup functionality etc. The vehicle subnetwork 711 may implement any appropriate network function required or desired for the implementation of a vehicle network that can support vehicle based end nodes and which can communicate and interface with the fixed network and access points.

The vehicle subnetwork 711 may in many embodiments consist in or comprise a Wi-Fi subsystem. The WiFi subsystem may e.g. provide wireless WiFi access throughout the vehicle, such as throughout a train, and may itself comprise WiFi access points, routers etc. Thus, a user of the end node 101 may simply connect to a local WiFi subsystem 711 (and specifically a conventional WiFi access point) to access the core network and the correspondent node 105. The WiFi subsystem may for example be a conventional WiFi system such as an IEEE 802ac (or earlier) system. Thus, a user on a moving vehicle, such as a train, may simply access a conventional local WiFi access point to gain Internet access.

In the system described, the wireless modems employ electronically steerable beamforming directional antenna that form a beam, and more specifically that form a directional pattern having a main beam that can be steered. Further, in the example two colocated wireless modems may employ directional antennas that may form a beams in different directions, such as specifically in a forward direction or range of directions and a rearward direction or range of directions respectively.

For example, in the example of FIG. 7, the two co-located wireless modems 111, 701 may employ electronically steerable beamforming directional antennas that are directed in substantially opposite directions, specifically in the direction of movement and in the opposite direction of movement, specifically one directional antenna may be directed in the rearward direction of the vehicle and the other being pointed in the rearward direction of movement.

Similarly, the other two co-located modems 113, 703 may employ directional antennas that are also directed in opposite directions, specifically in the direction of movement and in the opposite direction (forward/rearward). This may result in two wireless modems 111, 703 having beams formed generally in the forward direction (direction of movement) and two modems 113, 701 having beams formed generally in the rearward direction.

Thus, the different pairs/sets of colocated wireless modems may each comprise a wireless modem arranged to form a beam in substantially the same direction as a wireless modem of another pair/set of colocated wireless modems.

In many embodiments, the wireless modems may comprise a beam adapter which is arranged to adaptively steer the main beam of the electronically steerable beamforming directional antenna towards the appropriate access point. It will be appreciated that many different approaches and algorithms are known for steering a beam towards a desired transmitter and/or receiver and that any suitable approach may be used.

For example, the wireless modems may comprise an electronically steerable beamforming directional antenna in the form of an antenna array for forming a main directional beam and the wireless modems may comprise a beam adapter which dynamically is arranged to adapt the individual antenna phase and amplitude coefficients to direct the main beam towards the relevant access points, e.g. by applying a beam steering algorithm maximizing the received signal strength or signal to noise ratio as is well known in the art. As another example, more mechanical solutions may be used. For example, a horn antenna being electronically steerable using a stepper motor with electronic control may be used.

For two wireless modems connected to the same access point, such a steering may automatically and inherently result in the beams being formed in substantially the same direction for at least most locations. Specifically, when the distance between the wireless modems is small compared to the distance to the access point (say at least 5 or 10 times lower), the directions are inherently in substantially the same direction. This will in most applications be the case for the majority of locations of the vehicle. The beam forming of two wireless modems towards the same point (and specifically access point) will be in substantially the same direction for a distance to the vehicle being at least 5 or 10 times greater than a distance between the wireless modems.

Thus, such an adaptive steering may not only result in improved link quality for the individual link as the beam may be dynamically optimized, but may also inherently ensure that the beams of the different wireless modems are formed in substantially the same direction, and specifically are formed towards the same access point, for most locations of the vehicle.

The wireless modems having beams pointing in the same direction may be suitable for forming wireless links with the same access point 109. For example, the two wireless modems having beams pointing in the rearward direction may both be suitable for establishing a wireless link with an access point 109 further ahead along the route/track. Similarly, the two wireless modems having beams pointing in the rearward direction may both be suitable for establishing a wireless link with an access point 109 being further rearward along the tracks.

Figure 8:
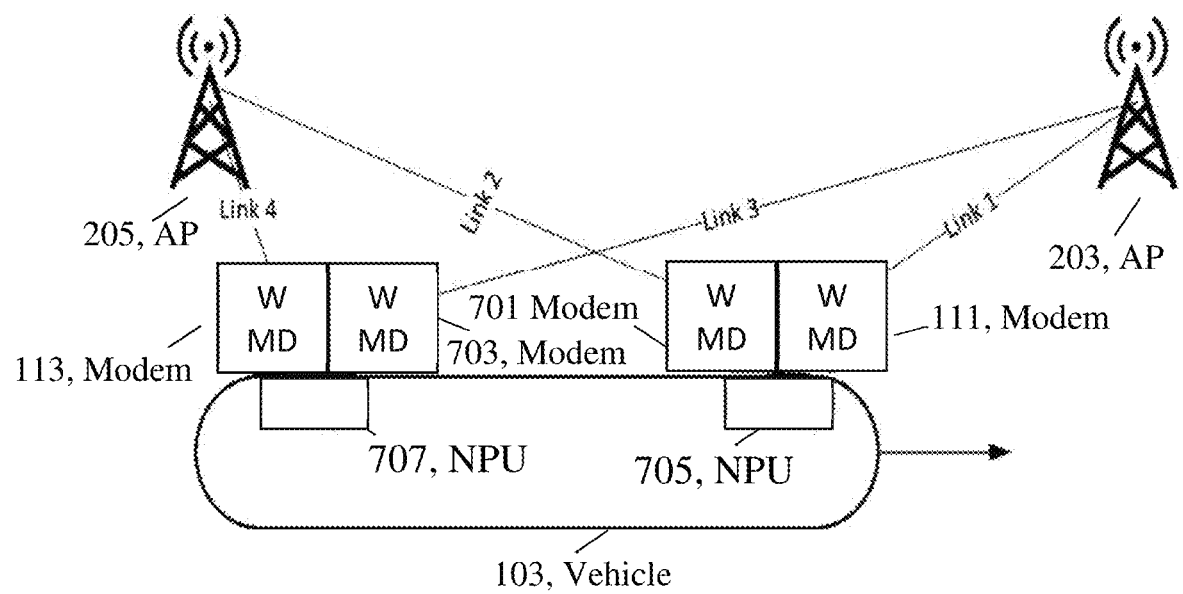
FIG. 8 illustrates an example of elements of a wireless communication system in accordance with some embodiments of the invention.
Figure 9:
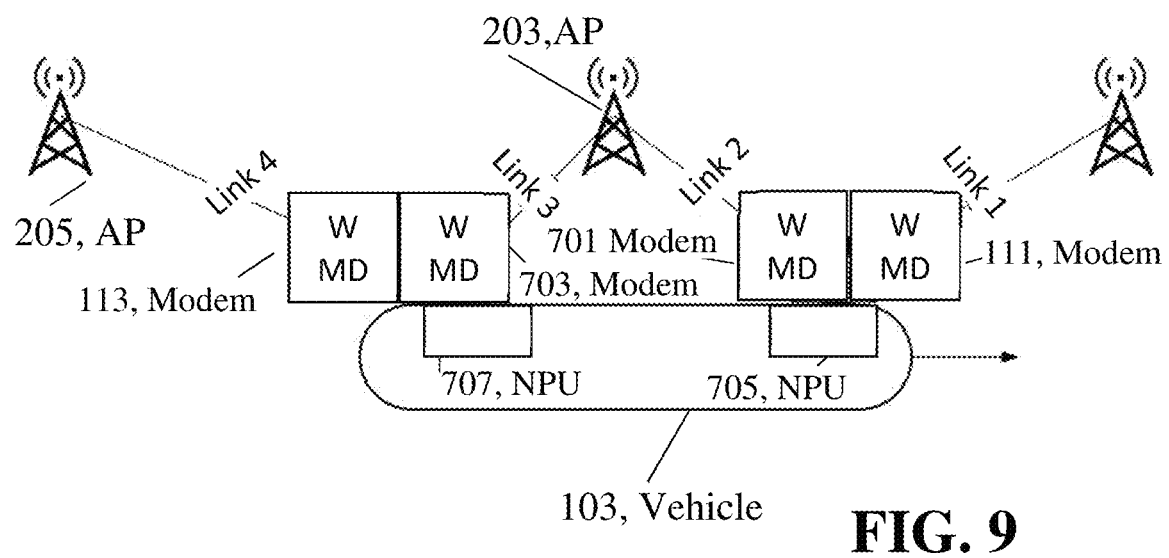
FIG. 9 illustrates an example of elements of a wireless communication system in accordance with some embodiments of the invention.

Similarly, the beam steering may be towards an access point rearward of the vehicle/train 103 and this may indeed be simultaneous with another of the colocated wireless modems steering a beam towards a forward access point. Thus, often a situation may occur where one set of colocated wireless modems have established links with respectively a rearward and rearward access point and thus forms beams in substantially opposite directions. At the same time, the other set of colocated wireless modems may have established links with respectively a rearward and rearward access point and thus also form beams in substantially opposite directions. Further, one pair of non-colocated wireless modems may form beams towards the rearward access point and thus substantially in the same rearward direction, and another pair of non-colocated wireless modems may form beams towards the rearward access point and thus substantially in the same rearward direction. Such an example is shown in FIG. 8. The establishment of a link may mean that the modem is associated to an access point. The link is available for sending data in either direction. FIG. 9 illustrates an example where the four wireless modems 111, 113, 701, 703 have formed simultaneous links with three different access points.

The vehicle may typically comprise a plurality of sets of colocated wireless modems. In many embodiments, the sets may be positioned at some distance to each other, such as specifically towards opposite ends of the vehicle. In many embodiments, different wireless modems in different sets may be arranged to form beams in corresponding directions. For example, each set may comprise one wireless modem facing in the rearward direction and one wireless modem facing in the rearward direction. In such scenarios, wireless modems in different sets being arranged to form beams in corresponding and typically substantially in the same directions will be referred to as aligned wireless modems.

Aligned wireless modems will typically be at a distance with respect to each other. In many embodiments, the distance between at least two aligned wireless modems of the vehicle will be no less than 5 m, 10 m, 20 m, 50 m, or even 100 m. In many embodiments, at least two aligned wireless modems will be disposed towards opposite ends of the vehicle, for example at the front and back of a bus or on respectively the first and last carriage of a train. Thus, at least two aligned wireless modems will be positioned proximal to opposite ends of the vehicle. In many embodiments, the distance between at least two aligned wireless modems may be no less than 5, 10, or 100 times greater than a distance from each of the two aligned wireless modems to the nearest of the front and of the back of the vehicle. Thus, in many embodiments, the distance between at least two aligned wireless modems may be no less than 5, 10, or 100 times greater than a distance from the front of the vehicle to the nearest of the two aligned wireless modems. Similarly, in many embodiments, the distance between at least two aligned wireless modems may be no less than 5, 10, or 100 times higher than a distance from the back of the vehicle to the nearest of the two aligned wireless modems.

In contrast to the aligned wireless modems, non-aligned wireless modems may often be positioned close to each other and specifically may typically be positioned such that a pair (or set) of non-aligned aligned wireless modems are substantially co-located. For example, in the specific embodiment described, a pair of forward facing aligned wireless modems are positioned at respectively the front and back of the vehicle, and similarly a pair of rearward facing aligned wireless modems are positioned at respectively the front and back of the vehicle. Further, the forward and rearward facing wireless modems at the front of the vehicle may be substantially co-located, and the forward and rearward facing wireless modems at the rear of the vehicle may be substantially co-located. This colocation may facilitate operation and specifically allow shared network functionality, such as e.g. the colocated non-aligned wireless modems sharing a common NPU for coupling to e.g. an Ethernet switch.

The aligned wireless modems are accordingly at a substantial distance to each other. As the beams are in the same direction, all aligned modems may potentially connect to the same access point and thus multiple wireless communication links may be set up from the vehicle/train to a given access point. Further, due to the distance between the aligned wireless modems, the properties of the wireless links will typically be substantially different and will vary in different ways. Indeed, even in scenarios where the average propagation characteristics to different aligned wireless modems is substantially the same (e.g. the vehicle is far from the access point), the instantaneous conditions may be very different and vary in a typically independent and substantially uncorrelated way. The performance of the individual links will differ because of difference in path loss and fading (fast fading or shadowing) and radio and antenna performance.

As mentioned, a major challenge for mm wave radio communication systems in general, and for systems supporting fast moving vehicles in particular, is that of how to optimize communication over the air interface. The wireless communications and links between the access points and wireless modems are subject to very fast and very substantially changing radio conditions and the communication capacity and reliability that can be achieved is typically constrained by the ability of the system to effectively adapt to the current conditions. For mm wave radio communication link communication, the effective coverage area for each access point is typically quite small leading to access point being at close distance and typically requiring many access points to cover a desired area or route. This is further exacerbated by the desire to provide effective operation in worst case conditions. This leads to a configuration of the system with the access points sufficiently close to provide contiguous coverage in worst case conditions (such as e.g. in the presence of heavy rain). For most of the time, conditions will typically exceed the conditions the system is designed for and the coverage areas of each access point may effectively be larger than expected thereby increasing the coverage overlap between access points.

For a potentially fast moving vehicle such as a train, the access point(s) most suitable for supporting the communication with the vehicle will typically change frequently as the vehicle moves through the coverage areas of the different access points. The conditions of the different mm wave radio communication links between the vehicle and access point may change very quickly and very substantially as the vehicle moves.

Accordingly link management is exceedingly important and critical in order to optimize performance and in particularly the link management in terms of terminating and/or establishing links between wireless modems and access points is important.

Typically, link management is based on the individual wireless modems monitoring link quality of existing links and making radio measurements of transmissions from other access points in order to determine which new links to setup. For example, typically, a wireless modem may maintain a link with an access point as long as the link quality is acceptable to make communication feasible. However, if it is detected that the link quality is unacceptable (in the extreme case that no data can be communicated) the wireless modem may consider that a link failure has occurred and that the link has dropped and is no longer available for communication. It may then initiate a search for a new access point to which a new link can be formed. This is typically in the form of a scan that searches for the presence of a beacon from an access point with sufficient strength and quality. If such a beacon is detected, the wireless modem proceeds to set up a link with the detected access point. As a vehicle moves along a route, the wireless modems will go through a process of continuously changing links as links drop and new links to new access points are set up. The wireless modems, and the system as a whole, thus continuously change links and adapt to the movement of the vehicle.

However, whereas this approach may provide highly advantageous performance in many scenarios, the Inventors have realized that it may be suboptimal in some scenarios. The Inventors have further realized that in some scenarios, improved performance can be achieved by using an approach for link management as described in the following with respect to the exemplary embodiments and scenarios of FIGS. 10-15.

Figure 10:
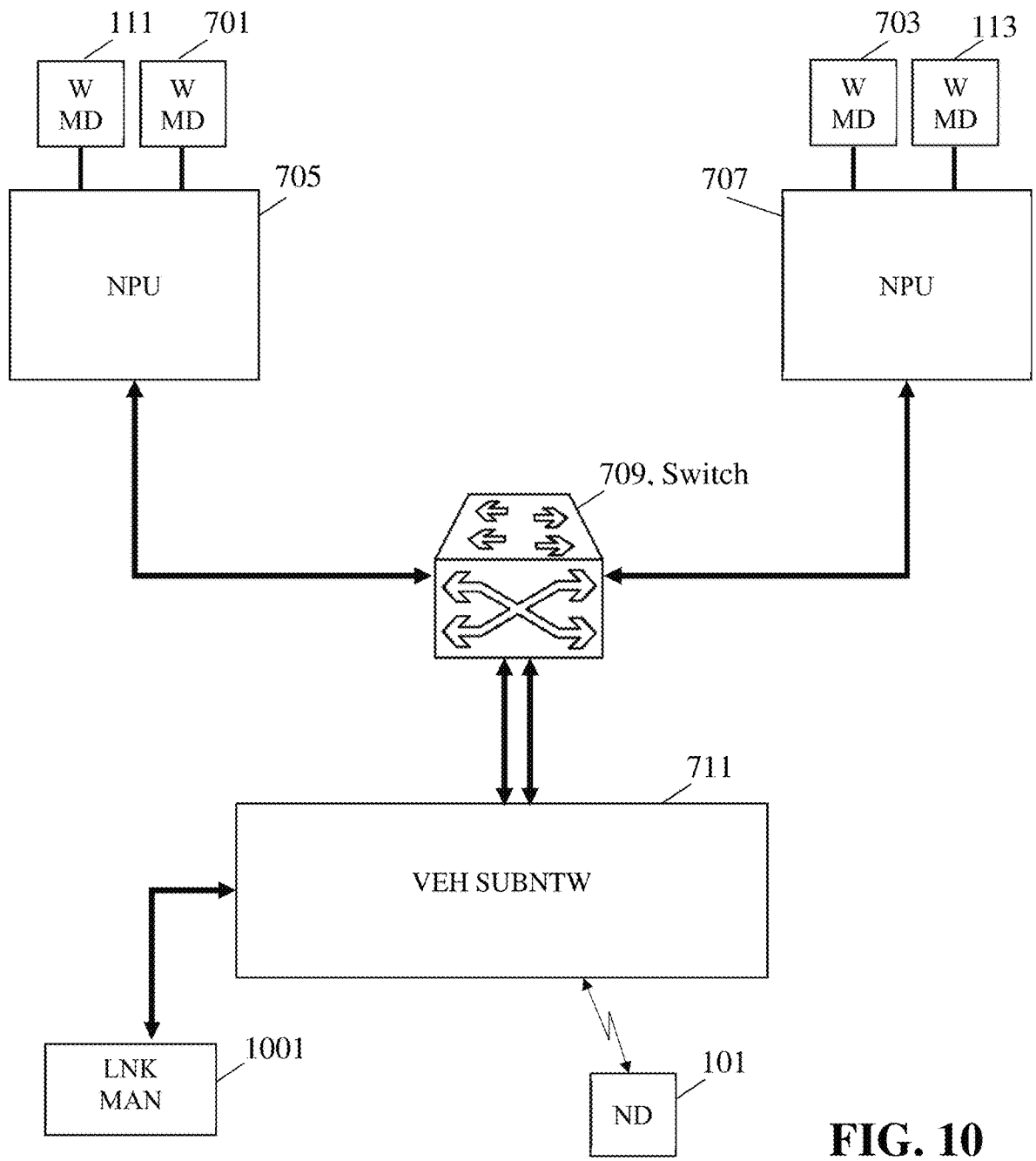
FIG. 10 illustrates an example of elements of a vehicle network for a wireless communication system in accordance with some embodiments of the invention.

In the system of FIG. 10, the vehicle 103 comprises a link manager 1001. FIG. 10 specifically corresponds to the system of FIG. 7 with the addition of a link manager 1001. In the system, advantageous performance may be achieved by the link manager 1001 being arranged to make decisions for one mm wave radio communication link based on events occurring for another mm wave radio communication link.

As an example, in a scenario where two (e.g. colocated) wireless modems have beams formed in opposite directions with one being in a rearward direction and one being in a rearward direction, the link manager 1001 may be arranged to terminate the link for the rearward beam link if a link failure occurs for the forward beam link. The link manager 1001 may then initiate the rearward facing wireless modem to seek to setup a new link to another access point. Thus, rather than individual link control and updates, the approach may perform a joint action such that a link failure on a forward link causes a rearward link to be terminated in order to seek to establish a new rearward link to another access point. This may specifically be done even if no link failure is present for the rearward link and indeed even if the rearward link is currently operating with a very high link quality and capacity.

In the following, examples will be described which focus on the operation of a pair of wireless modems having beams in a forward and rearward direction, and the pair will specifically be considered to correspond to the pair of colocated modems 111, 701 towards the front of the vehicle 103. However, it will be appreciated that the examples may also be applied to other pairs of wireless modems, such as e.g. a pair of colocated modems positioned towards the rear of the vehicle 103. Also, although the approach may be particularly suitable for colocated modems, this is by no means a required or essential property. Indeed, the approach may be applied to pairs of wireless modems that are not colocated. For example, the approach could e.g. be applied to a pair consisting of a wireless modem forming a beam in a forward direction and being located towards the front of the vehicle and a wireless modem forming a beam in a rearward direction and being located towards the rear of the vehicle.

For clarity and brevity the pair of wireless modems forming beams in the forward and rearward directions will be referred to as a pair of opposing wireless modems and the wireless modem forming a beam in a forward direction will be referred to as the forward directed modem with the beam being referred to as the forward beam, and the wireless modem forming a beam in a rearward direction will also be referred to as the rearward directed modem with the beam being referred to as the rearward beam. Similarly, links in the rearward direction from the vehicle (supported by the rearward directed modem 701) will be referred to as rearward links or rearward directed links, and links in the forward direction from the vehicle (supported by the forward directed modem 111) will be referred to as forward links or forward directed links.

The following examples will focus on examples where the forward directed modem is wireless modem 111 and the rearward directed modem is the wireless modem 701 of the previous figures. Thus, the pair of opposing wireless modems are formed by the substantially co-located forward directed modem 111 and rearward directed modem 701.

In the example, the link manager 1001 may accordingly be arranged to control the status of the rearward link based on the forward link. Specifically, the link manager 1001 may detect that a link failure occurs for a forward link. This may cause the forward directed modem 111 to seek to setup a new forward link which may typically result in a link being established to an access point towards which the vehicle 103 is moving. However, in addition, the link failure also results in the link manager 1001 terminating the current rearward link supported by the rearward directed modem 701. Thus, although the radio conditions and capacity may be sufficient to support communication between the rearward directed modem 701 and the access point with which it has formed a link (and thus with which it has an association), the link manager 1001 may proceed to terminate and drop the link/association.

Further, the link manager 1001 is arranged to terminate the rearward link termination but in addition it is arranged to initialize the setup of a new rearward link, i.e. it may initialize a process seeking to establish a new rearward link/association using the rearward directed modem 701.

When the link manager 1001 determines that a link failure has occurred for the forward link it accordingly proceeds to terminate the rearward link and to initialize the setup of a new rearward link.

In the approach, the forward link may thus control the rearward link, and the dynamic link changes when the vehicle moves are not separate or individually based on the radio conditions for the individual link but are based on a joint approach where the forward link affects the rearward link. The approach has been found to provide a substantially improved performance in many scenarios and systems. It has been found to result in improved overall air interface capacity with improved overall throughout and/or reliability. The approach may also provide an improved adaptation to different conditions such as to different weather conditions.

For example, in existing systems, when good propagation conditions exist (e.g. during dry weather for a system designed for worst case conditions of heavy rain), links can be maintained for much longer distances than when poor propagation conditions exist (e.g. heavy rain). Thus, effectively the coverage areas of the access points, and thus the overlap between them, will be much larger, and if link termination does not occur until link performance has degraded to no longer be acceptable, this may not occur until the vehicle is far into the coverage area of a neighbor access point. Indeed, it may even pass the neighbor access point and this may be within the beam interval for the rearward directed modem 701 (the beam interval may be the range of directions in which a bean can be formed by the antenna of the rearward directed modem 701 and may specifically be the beam scanning range). Thus, the rearward directed modem 701 may maintain a link/association to an access point much further away and providing acceptable but suboptimal performance. The link manager 1001 of FIG. 10 may cause a link change for the rearward directed modem from the further away access point to the closer access point.

The approach may further facilitate implementation and reduce the resource requirements. For example, a more efficient link/association adaptation can be achieved without requiring separate functionality and radio functions for adapting the links. For example, typically a wireless modem is capable of supporting an existing link or of searching/scanning for available access points, but is not capable of doing both at the same time (e.g. due to this requiring at least two radio circuits). Typically, a link is accordingly maintained as long as the link performance is considered acceptable even if a potentially better candidate access point is present. However, this may result in an adequate but suboptimal link being maintained instead of switching to a possible link that may provide improved performance.

The approach may be particularly suitable for embodiments in which the vehicle 103 is arranged to move along a predetermined route. In some embodiments, the vehicle may be assumed to travel along a specific predetermined route. For example, the access points may support vehicles travelling along a motorway or may support a train moving along a train track. The predetermined route may in some embodiments provide a line of positions or may in some embodiments include a set or range of possible positions. For example, the vehicle 103 may travel along a predetermined route formed by a train track or may e.g. travel along a predetermined route defined by a set of tracks or e.g. a road with multiple lanes. In such cases, the predetermined route may correspond to the road or set of tracks rather than to an individual track or lane.

The predetermined route may accordingly constrain the spatial relationship between the vehicle 103 and the different access points as the vehicle 103 moves along the predetermined route. Although such a spatial constraint is not necessary or essential (e.g. in some embodiments where there is no spatial constraint, the approach may not be guaranteed to provide improved performance for all vehicle movements but may still overall be advantageous by improving performance for some movements), it may in many scenarios provide improved performance and may result in a more efficient system.

In the following, an example will be described in which access points are further arranged with two substantially colocated access points (or specifically with the antennas of a pair of access points being colocated) but with the two access points forming beams in different directions. For example, directional antennas of two access points may be mounted on the same mast but use beamforming that directs beams in different directions. In particular, the two beams of the colocated access points may be aimed along opposite directions of the predetermined route along which the vehicle 103 is moving (e.g. in opposite directions of a train track next to which the mast carrying the directional antennas are positioned). In many embodiments, the (antennas of) two access points may be substantially colocated and form directional beams in different, and typically opposite directions.

In the example, neighboring access points may also form beams in different directions, and specifically directional beams of neighbor access points may be arranged such that for a section of a predetermined route the neighbor access points may be in different, and often opposite (along the predetermined route), directions but with the beams of the neighbor access points being directed towards the section of the predetermined route.

Figure 11:
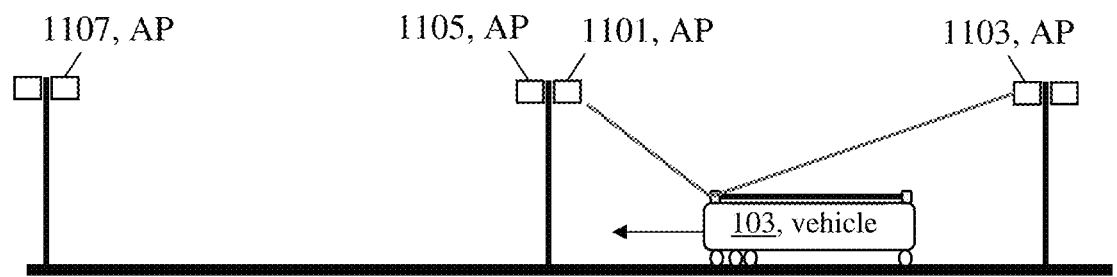
FIG. 11, FIG. 12, FIG. 13, FIG. 14 and FIG. 15 illustrate an example of link management elements of a wireless communication system in accordance with some embodiments of the invention.

An example of such a scenario is illustrated in FIG. 11 which may correspond to the example of FIG. 9. For clarity, the example will be described with reference to a train travelling along a train track but it will be appreciated that this is merely an example and that the described approach apply equally to other scenarios, such as e.g. a car or bus travelling along a road. In the example, antenna masts are positioned along the track with each mast supporting two access points with directional antennas forming beams in opposite directions along the track.

Initially, the train 103 may be positioned somewhere between two masts and the forward directed modem 111 may have a first mm wave radio communication link formed to a first access point 1101 being a rearward directed access point 1101. The rearward directed modem 701 may have a second mm wave radio communication link formed to a second access point 1103 being a forward directed access point 1103. The first mm wave radio communication link is thus a forward link/association of the forward directed modem 111 to a first access point being positioned in a forward direction of the current position of train (the distance between the train and the rearward directed access point 1101 will reduce as the train moves forward). The second mm wave radio communication link is a rearward link/association of the rearward directed modem 701 to a second access point being positioned in a rearward direction of the current position of train (the distance between the train and the second access point 1103 will increase as the train moves forward).

As the train moves forward, it will at some point reach a point where the forward link exhibits a link failure, such as specifically the throughput and/or reliability falls below a given threshold. The directional antenna of the forward directed modem 111 may specifically be arranged such that it can only form a beam within a given (forward) azimuth angle interval. For example, in many embodiments, the forward beam is limited to an angle of ±90° (or even ±45° in many practical cases) with respect to the direction of travel of the vehicle/train. In such a scenario, the most extreme angle that can be formed is thus perpendicular to the train.

Further, the beamforming of an access point is typically such that it is formed in the direction of the track. Typically, the access point is set back from the track by some distance and the main lobe of the beam direction will therefore often be restricted to not cover the part of the track which is closest to the access point.

Accordingly, a dead zone in which the wireless modem and access point cannot provide efficient communication is often formed very close to the access point. Thus, in contrast to an expectation that link quality improves with decreasing distance, the directional beamforming often results in a section close to the access points in which communication is not supported.

Figure 12:
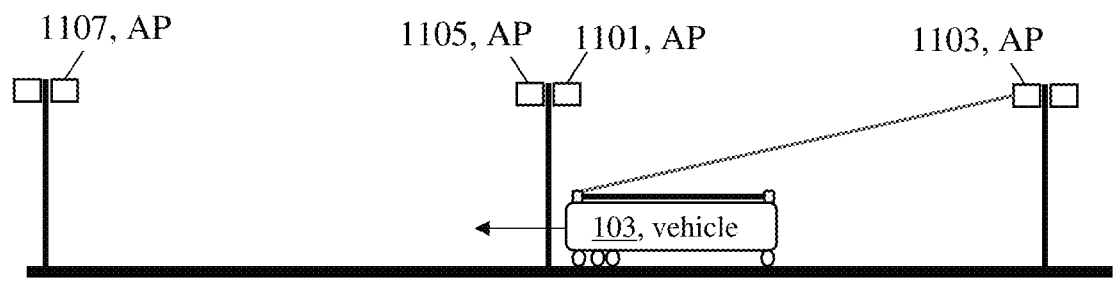
Figure 13:
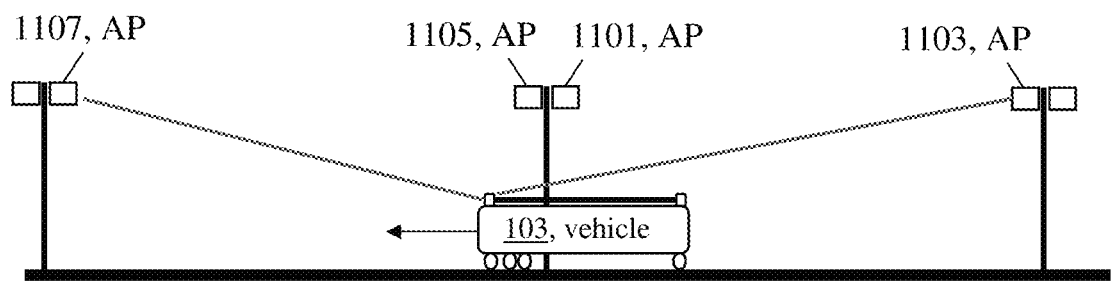

As a result, as illustrated in FIG. 12, the forward link may often drop when getting sufficiently close to the access point that is serving it, i.e. to the rearward directed access point 1101. When the forward link drops, the forward directed modem 111 may begin to seek to establish a link/association with a new access point. It may specifically perform a scan to seek for other beacons and if a suitable access point 1107 is identified, the forward directed modem 111 may establish a new link to this access point 1107. This access point 1107 will typically be a rearward access point from a neighboring mast rather than be the access point 1105 which is colocated with the original rearward access point 1101. Specifically, as the forward directed modem 111 has a forward facing beam it will typically receive this access point beacon with a stronger signal than the colocated forward facing access point 1105 as this will typically be outside the main beam (especially if the train has moved past the access point 1105). Indeed, in some embodiments, the forward directed modem 111 may specifically be arranged to only consider rearward facing access points (e.g. indicated by data of the beacon or by only scanning the radio channel supported by rearward facing access points with a configuration that rearward and forward facing access points use different channels). Thus, a new rearward facing link/association may be set up between the forward directed modem 111 and a new rearward facing access point 1107 as illustrated in FIG. 13.

In some embodiments, the forward directed modem 111 may not be able to connect to access point 1107 immediately after the link to access point 1101 has failed, and the rear directed modem 701 may connect to access point 1105 before the forward directed modem connects to 1107.

Further, in response to the link failure, the link manager 1001 is arranged to terminate the original rearward link between the rearward directed modem 701 and the original forward facing access point (the second access point 1103). Thus, the original rearward mm wave radio communication link from the pair of opposing wireless modems is dropped by the link manager 1001. Further, the link manager 1001 initializes the setting up of a potential new link between the rearward directed modem 701 and a new candidate access point. The initialization may be by a direct command, instruction, or action by the link manager 1001 or may be an automatic consequence of the termination of the original rearward link. For example, the rearward directed modem 701 may be arranged to automatically scan for a new link if no current link/association is formed and thus the termination of an existing link may automatically result in the initialization of a potential new link. Thus, the initialization of the setup of a third/new mm wave radio communication link from the rearward directed modem 701 may result from the link manager's 1001 action to terminate the original rearward link.

In some embodiments, the setting up of a new link may be based on a scanning process and may follow the same procedure as in any other situation in which the rearward directed modem 701 may seek to establish a new link. Thus, in some embodiments, the same process for setting up a potential new link to a potential new candidate access point is the same regardless of whether this process is initialized as a result of a link failure for a forward link from the forward directed modem 111 or not.

In many embodiments, the link manager 1001 may in response to the link failure for the original forward directed link be arranged to terminate a rearward directed mm wave radio communication link between the rearward directed modem 701 and a forward directed serving access point and to initiate the scanning for a candidate access point for a new rearward directed link.

A scanning for access points may include searching for transmissions from different access points in order to detect access points that can support setup of a mm wave radio communication link. The detection may include a determination of a radio propagation measure for an access point from which a transmission is detected.

In many systems, access points transmit beacon signals that can be assessed by wireless modems that are within coverage. In mmWave systems with directional antennae, the beacon transmissions may take place using a directional beam, with the beam direction adjusted after each transmission such that all the intended coverage area is addressed. Thus, a wireless modem can determine a radio propagation measure from the receipt of a beacon transmission from an access point. For example, beacons may be transmitted with a nominal power level and the received signal level may accordingly provide a radio propagation measure that is indicative of the attenuation for a mm wave radio communication link between the access point and the wireless modem. A modem may only attempt to connect to an access point after detection of beacon transmissions from that access point. If the beacon cannot be received from an access point, a connection to that access point is typically not possible.

Thus, a wireless modem may perform a scan of possible transmissions (typically beacon transmissions) from access points and determine a radio propagation measure for detected transmissions. The link manager 1001 (or indeed the wireless modem itself) may then seek to establish a new mm wave radio communication link based on the radio propagation measures. In particular, it may select to setup a new mm wave radio communication link to an access point based on the determined radio propagation measures, and specifically it may select to setup a new mm wave radio communication link to an access point for which the determined radio propagation measure meets a criterion. The criterion may be one that is indicative of a high likelihood that a mm wave radio communication link capable of supporting communication between the vehicle and the access point can be setup. A scan may include monitoring a plurality of possible transmissions channels and determining radio propagation measures for each possible transmission channel for which a transmission has been detected. The transmissions may specifically be beacon transmissions and the possible transmission channels may specifically be beacon channels. Thus, the scan may monitor a plurality of beacon channels and determine radio propagation measures for detected beacon transmissions in the beacon channels. If more than one beacon, and thus access point, is detected, the access point of the strongest beacon may typically be selected for setting up a new link.

The scanning may in many embodiments be a sequential scanning but may in some embodiments possibly include parallel evaluations.

The scan may thus identify a candidate access point to which a new mm wave radio communication link can be setup and as a result a new link/association to that candidate access point may be established.

Figure 15:
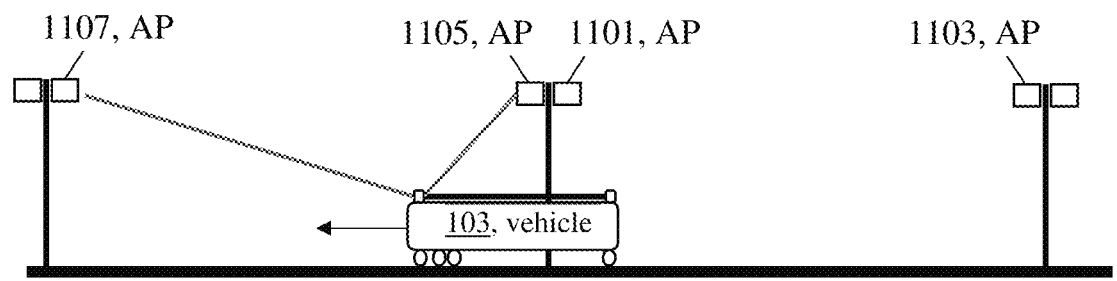

Further, due to the link failure being likely to occur due to the forward directed modem 111 being close to the original rearward directed access point 1101, it is likely that the vehicle will identify the forward directed access point 1105 as the candidate access point. As a result of the initialization process, the rearward directed modem 701 may accordingly setup a new link to a new candidate access point 1105 as illustrated in FIG. 15. The result of the operation is thus that the rearward directed link is changed from the original link with the original forward directed access point 1103 to the new forward directed access point 1105. The link failure of the original forward directed link accordingly forces a change of the rearward link to an access point which is likely to provide better support for the link. The update occurs based on the conditions of the forward directed link and may be independent of radio conditions of the original rearward directed link. The overall link performance may thus be improved further even though the original rearward directed link provided satisfactory performance.

In some embodiments, the selection of a new candidate access point for a new link from the rearward directed modem 701 may be based directly on the result of the scanning without any further considerations. For example, in some embodiments, the rearward directed modem 701 may simply try to form a link with the access point for which the highest signal level or signal to noise ratio is detected. In many embodiments, such an approach may provide sufficiently high probability that a suitably advantageous access point is detected.

However, in other embodiments, further considerations may be taken into account when determining a new rearward link.

For example, the beacon transmission may include an indication of whether the access point is rearward facing or forward facing (the access point may e.g. indicate which direction of the track is covered and the vehicle 103 may determine whether this corresponds to a forward or rearward direction based on knowledge of travel direction). In such a case, the setting up of a new link may be subject to the constraint that the access point must be forward directed to complement the rearward directed modem 701.

The described approach will in most scenarios and cases result in a new link being formed with a new access point, and specifically with an access point that is different from both the access point of the original forward directed link and the access point of the original rearward directed link, i.e. in the example a link is formed to a new access point 1105 that is different from the original pair of opposed access points 1101, 1103. Indeed, typically the approach results in the formation of two new links to two new access points.

In some embodiments, the system may further specifically include a constraint or requirement that the new link is formed with an access point that is different from the access points of the original links (or in some cases is different from the access point of the original forward directed link, or in other cases is different from the access point of the original rearward directed link). For example, an access point identifier may be transmitted as part of the beacon transmissions, and the link manager 1001 may be arranged to reject any beacon/access point having an identifier matching one of the identifiers of the original access points.

In some embodiments, the termination of the original rearwards link and the formation of a new rearwards link may be independent of whether a new forwards link is formed by the forward directed modem 111 after the link failure. However, in some embodiments the termination of the rearwards link may further by dependent on the forward directed modem 111 forming a new link with a new access point. Thus, in some embodiments, the termination of the rearwards link may be dependent on a forward link already being established. This may ensure that at least one link exists to an access point from a set of colocated wireless modems.

In some embodiments, the system may employ a timing that in many scenarios results in improved performance. In particular, in many embodiments, the link manager 1001 may be arranged to start a timer on detection of the link failure and to terminate the second mm wave radio communication link (only) when the timer exceeds an expiry time. Thus, the link manager 1001 may be arranged to implement a delay between the link failure occurring and the original rearward link being terminated. The link manager 1001 may be arranged to start a timer on detection of the forward link having a link failure and to terminate the rearward link when a time since the link failure exceeds a first duration (corresponding to the expiry/delay time).

Implementing a delay may in many embodiments provide improved performance and may specifically increase the probability that the rearward directed modem 701 forms a new link with a suitable access point, such as specifically a forward directed access point 1105 located close to the rearward directed access point 1101 with which the forward directed modem 111 initially had formed a link.

This may be illustrated by considering FIGS. 11-15. The forward directed modem 111 may as shown in FIG. 12 experience a link failure at when it is close to the rearward directed access point 1101, and indeed due to the restricted interval in which the directional antennas can often form beams, this often occurs before the forward directed modem 111 has reached the closest point to the rearward directed access point 1101. At the time of the link failure, the rearward directed modem 701 is accordingly also behind the beam of the new forward directed access point 1105.

Figure 14:
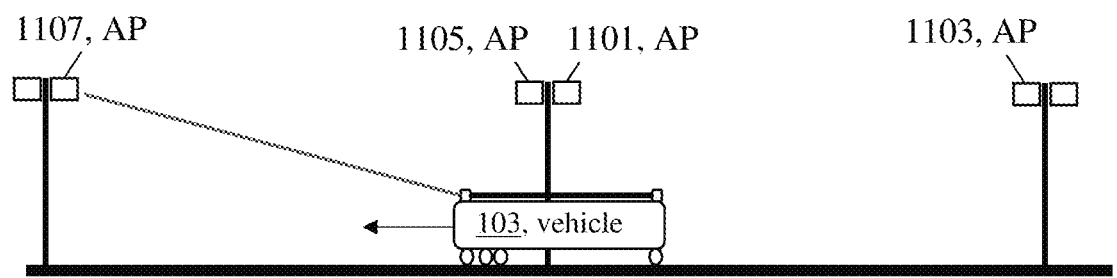

However, delaying the setup of a new link may, due to the movement of the vehicle result in the vehicle, or at least the forward directed modem 111 and the rearward directed modem 701, moving past the mast carrying the rearward directed access point 1101 and the new rearward facing access point 1105. Accordingly, by introducing a sufficient delay, the initialization of the new rearward link (e.g. the initialization of the scanning) can be delayed until the rearward directed modem 701 has moved into the beam of the new rearward facing access point 1105 (FIG. 14). Thus, the delay may increase the likelihood of the rearward directed modem 701 establishing a new link/association with the new rearward facing access point 1105 (FIG. 15) rather than e.g. the rearward directed access point 1101 or a forward directed access point further behind (e.g. the forward directed access point 1103 or even another forward directed access point further away).

In some embodiments, the link manager 1001 may further be arranged to stop the timer in response to a detection that a link between the forward directed modem 111 and the rearward directed access point 1101 is re-established. In some embodiments, if a link is formed between the forward directed modem 111 and the rearward directed access point 1101 before the timer has reached the expiry time/delay, the link manager 1001 may be arranged to cancel (or at least delay) the termination of the original rearward link (and the initialization of a new link). The link manager 1001 may in some embodiments, stop or reset the timer, but will typically in many embodiments be arranged to abandon the operation of the termination of the original rearward link completely.

This may provide performance in many scenarios and embodiments, and may in particular in many scenarios provide a more reliable operation. In many embodiments, the approach may provide increased resilience to varying propagation conditions. For example, link failure may occur due to other causes than the forward directed modem 111 approaching the rearward directed access point 1101. For example, the vehicle 103 may move through a short fade resulting in the forward link experiencing a link failure from which it may recover when exiting the fade, or the original link may be terminated with a new link to the same access point (the original rearward directed access point 1101) being established shortly after. The introduction of a delay may typically reduce the risk that the original rearward link is terminated in case of short link failures such as those described.

The expiration time/duration of the delay is a design parameter that may be determined based on the specific preferences and requirements of the specific embodiment. The design choices may for example consider typical speeds of the vehicle, spatial relations between a predetermined route and the access point(s), preferred trade-off between resilience to link failures due to fades etc. and timely link establishment to the new forward directed access point.

In many embodiments, the expiry time/duration of the delay is no less than 5 msec, 20 msec, 100 msec, 200 msec, 0.5 sec, 1 sec, or 5 seconds. In many embodiments, the expiration time/duration of the delay is no more than 100 msec, 200 msec, 0.5 sec, 1 sec, 5 sec, 10 sec, 20 sec or 60 seconds.

In many embodiments, the expiry time/duration of the delay may be adaptable.

In some embodiments, the link manager 1001 may be arranged to adapt the expiry time in response to a speed indication for the vehicle. In many embodiments, the link manager 1001 may be arranged to reduce the expiry time/delay in response to an increasing speed of the vehicle 103.

Many vehicles comprise functionality for measuring the speed of the vehicle and the functionality may be arranged to provide speed data to the link manager 1001. In other embodiments, a dedicated speed measurement function may be included or indeed the link manager 1001 may itself estimate the speed at which the vehicle 103 is moving. For example, the frequency of link changes may be indicative of how frequently the vehicle 103 passes by an access point and if knowledge about the positioning of access points is available or assumed (e.g. that they are substantially equidistant), the frequency may be indicative of the speed of the vehicle 103. As another example, speed may be determined from an onboard GPS receiver.

Based on the speed estimate, the link manager 1001 may adapt the expiry time. For example, the expiry time may be determined as a function of the speed or e.g. by using the speed estimate to perform a look up in a Look Up Table providing a corresponding expiry time value. The link manager 1001 may accordingly for a fast moving vehicle 103 set the expiry time quite low whereas it may be set substantially higher for a slow moving vehicle. This may reduce variation in the link change over operation and may result in less variation in the positions at which the link change occurs.

In some embodiments, the link manager 1001 may be arranged to adapt the expiry time in response to a beam form property for the electronically steerable beamforming directional antennas of the forward directed modem 111. In particular, the link manager 1001 may be arranged to adapt the expiry time in response to a beamform parameter being indicative of a property of the directional pattern(s) formed by the directional antenna of the forward directed modem 111. In particular, the link manager 1001 may be arranged to adapt the expiry time in response to a beam width property for a main beam formed by the antenna. The beam width property may be a maximum beam width, a typical beam width, a beam width for a particular position/beam direction and/or a minimum beam width. In some embodiments, the link manager 1001 may be arranged to adapt the expiry time in response to a beam direction property for a main beam formed by the antenna. The beam direction property may be a maximum azimuth beam direction with respect to the vehicle 103, such as specifically a largest azimuth angle with respect to the nominal travel direction for the vehicle 103, a beam direction interval of the possible beam directions. The beam parameters may specifically be for a main beam formed by the antenna of the forward directed modem 111.

Similarly, alternatively or additionally, in some embodiments, the link manager 1001 may be arranged to adapt the expiry time in response to a beam form property for the electronically steerable beamforming directional antennas of the rearward directed access point 1101. In particular, the link manager 1001 may be arranged to adapt the expiry time in response to a beamform parameter being indicative of a property of the directional pattern(s) formed by the directional antenna of the rearward directed access point 1101. In particular, the link manager 1001 may be arranged to adapt the expiry time in response to a beam width property for a main beam formed by the antenna. The beam width property may be a maximum beam width, a typical beam width, a beam width for a particular position/beam direction and/or a minimum beam width. In some embodiments, the link manager 1001 may be arranged to adapt the expiry time in response to a beam direction property for a main beam formed by the antenna. The beam direction property may be a maximum azimuth beam direction with respect to the vehicle 103, such as specifically a largest azimuth angle with respect to the nominal travel direction for the vehicle 103, a beam direction interval of the possible beam directions. The beam parameters may specifically be for a main beam formed by the antenna of the rearward directed access point 1101.

The link failure of the original forward link will typically be highly dependent on the directional properties of the radiation patterns generated by the antennas. Specifically, the link failure may often occur when the position of the vehicle 103 relative to the rearward directed access point 1101 is such that the beams are not aimed towards the other antenna. The antenna gain values for the antennas at either end of the forward link in the direction between the forward directed modem 111 and rearward directed access point 1101 may thus be very low, resulting in an overall gain for the link that may cause the link failure. Indeed, the line of sight direction between the antennas may fall in a null of the radiation pattern. The exact vehicle position at which the antenna gains are insufficient to maintain communication will depend on many parameters including the beamform properties of the two directional antennas involved in the communication.

Figure 16:
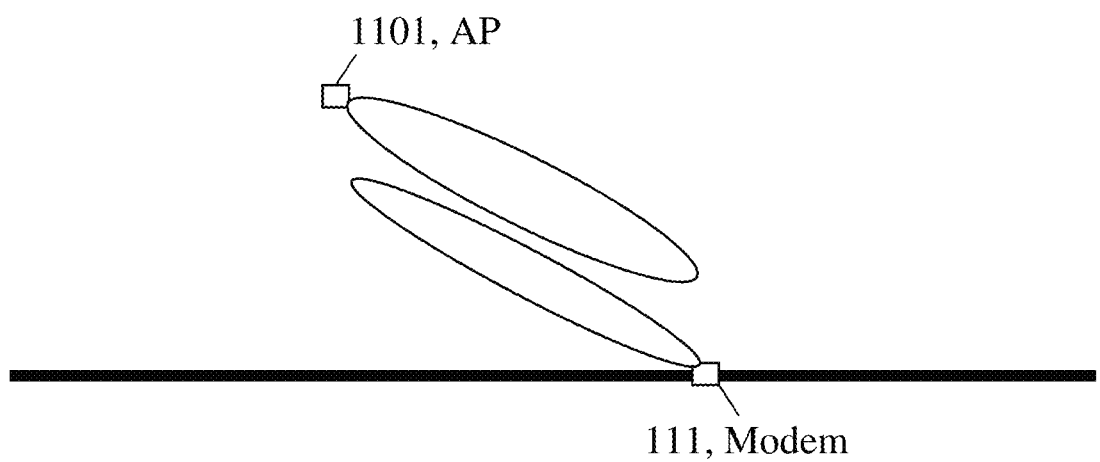
FIG. 16 and FIG. 17 illustrate an example of beam formations in a wireless communication system in accordance with some embodiments of the invention.

For example, if, as illustrated by the example of FIG. 16 which shows an exemplary train scenario from above, both the directional antenna of the rearward directed access point 1101 and the directional antenna of the forward directed modem 111 are only capable of forming beams that are quite narrow and which can only be steered within an interval that is relatively narrow around the direction of the track and train (say less than 45°), then link failure may occur when the forward directed modem 111 is relatively far from the closest position to the rearward directed access point 1101.

Figure 17:
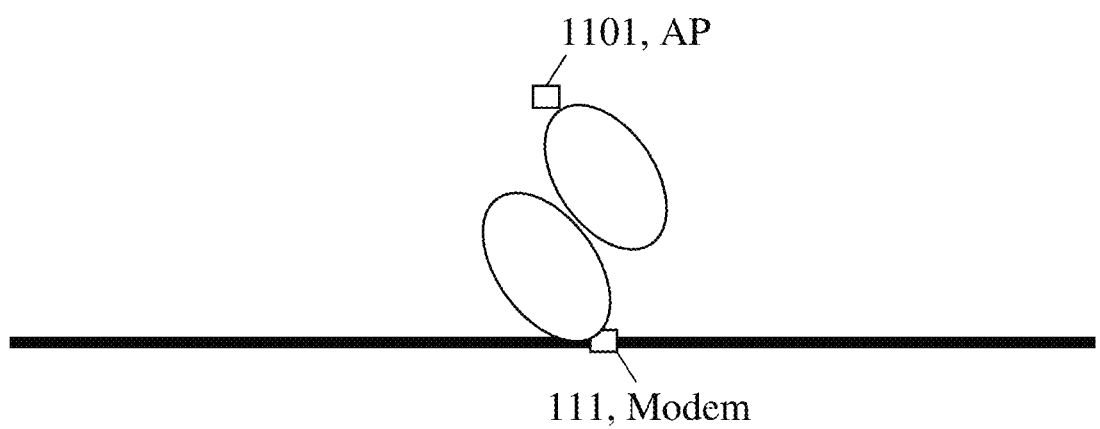

However, if instead, as illustrated by the example of FIG. 17, the directional antennas of both the rearward directed access point 1101 and the forward directed modem 111 are capable of forming beams that are quite broad and which can be steered within an interval that is relatively broad around the direction of the track and train (say up to 80°), then link failure may occur substantially later and potentially even after the forward directed modem 111 has passed the closest position to the rearward directed access point 1101.

The link manager 1001 may accordingly adapt the expiry time to take into account such parameters. Typically, the link manager 1001 stores information of the beamforming properties of the directional antenna of the forward directed modem 111 and may adapt the expiry time based on this. In many embodiments, the access points may be arranged to transmit information of beamforming capability to the wireless modems, e.g. as part of beacon transmissions or as direct transmissions. The link manager 1001 may then be provided with the received parameters and use them to adapt the expiry time. It will be appreciated that the exact function for adapting the expiry time will depend on the specific embodiment and the desired performance and that this is a design issue to consider for the specific implementation. It will also be appreciated that the determination may consider many different parameters including vehicle speed etc.

Also, in some embodiments, the link manager 1001 may alternatively or additionally be arranged to adapt the expiry time in response to a beamform property for the electronically steerable beamforming directional antennas of the rearward directed modem 701. In particular, the link manager 1001 may be arranged to adapt the expiry time in response to a beamform parameter being indicative of a property of the directional pattern(s) formed by the directional antenna of the rearward directed modem 701. In particular, the link manager 1001 may be arranged to adapt the expiry time in response to a beam width property for a main beam formed by the antenna. The beam width property may be a maximum beam width, a typical beam width, a beam width for a particular position/beam direction and/or a minimum beam width. In some embodiments, the link manager 1001 may be arranged to adapt the expiry time in response to a beam direction property for a main beam formed by the antenna. The beam direction property may be a maximum azimuth beam direction with respect to the vehicle 103, such as specifically a largest azimuth angle with respect to the nominal travel direction for the vehicle 103, a beam direction interval of the possible beam directions. The beam parameters may specifically be for a main beam formed by the antenna of the forward directed modem 111.

Similarly, alternatively or additionally, in some embodiments, the link manager 1001 may be arranged to adapt the expiry time in response to a beam form property for the electronically steerable beamforming directional antennas of the forward directed access point 1105. In particular, the link manager 1001 may be arranged to adapt the expiry time in response to a beamform parameter being indicative of a property of the directional pattern(s) formed by the directional antenna of the forward directed access point 1105. In particular, the link manager 1001 may be arranged to adapt the expiry time in response to a beam width property for a main beam formed by the antenna. The beam width property may be a maximum beam width, a typical beam width, a beam width for a particular position/beam direction and/or a minimum beam width. In some embodiments, the link manager 1001 may be arranged to adapt the expiry time in response to a beam direction property for a main beam formed by the antenna. The beam direction property may be a maximum azimuth beam direction with respect to the vehicle 103, such as specifically a largest azimuth angle with respect to the nominal travel direction for the vehicle 103, a beam direction interval of the possible beam directions. The beam parameters may specifically be for a main beam formed by the antenna of the forward directed access point 1105.

The establishment of the new rearward link between the rearward directed modem 701 and the forward directed access point 1105 will typically be highly dependent on the directional properties of the radiation patterns generated by the antennas of these. Specifically, the position of the vehicle 103 relative to the forward directed access point 1105 at which the link can be performed such that they are aimed towards the other antenna may depend on the beam properties. The exact vehicle position at which the antenna gains are sufficient to maintain communication will depend on many parameters including the beamform properties of the two directional antennas involved in the communication.

For example, for directional antennas which are only capable of forming beams that are quite narrow and in a relatively narrow interval, the vehicle 103 may have to move quite far past the forward directed access point 1105 before a link formation will be successful. If instead the directional antennas are capable of forming beams that are quite broad and which can be steered within an interval that is relatively large, then link establishment may be possible for the vehicle being substantially closer to the forward directed access point 1105.

The link manager 1001 may accordingly adapt the expiry time to take the beam forming properties of the forward directed access point 1105 and the rearward directed modem 701 into account. Similarly to described before, the link manager 1001 may store information of the beamforming properties of the directional antenna of the rearward directed modem 701 and may adapt the expiry time based on this. The link manager 1001 may be provided with beam form properties for the forward directed access point 1105 which are received by transmission from this access point. The link manager 1001 may for example be arranged to increase the expiry time for narrower beams and beam direction intervals as these are likely to require the vehicle to be further from the forward directed access point 1105. An increasing expiry time is likely to result in the vehicle having moved further such that link establishment is more likely to be possible at the expiry time. In many embodiments, the link manager 1001 may increase the expiry time for an increasing dead zone around the access points (specifically the forward directed access point 1105 and the rearward directed access point 1101).

In some embodiments, the link manager 1001 may be arranged to adapt the expiry time in response to a spatial relationship between the rearward directed access point 1101 and a predetermined route for the vehicle. In particular, the link manager 1001 may be arranged to adapt the expiry time in response to a minimum distance between the rearward directed access point 1101 and a predetermined route for the vehicle.

In some embodiments, the link manager 1001 may be arranged to adapt the expiry time in response to a spatial relationship between the forward directed access point 1105 and a predetermined route for the vehicle. In particular, the link manager 1001 may be arranged to adapt the expiry time in response to a minimum distance between the forward directed access point 1105 and a predetermined route for the vehicle.

The predetermined route may specifically in the example be the track along which the vehicle/train travels. Thus, in the example, the link manager 1001 may adapt the expiry time dependent on how close the mast carrying the forward directed access point 1105 and the rearward directed access point 1101 is to the track.

As previously described, the performance of the links (whether the original link or the new links) depends on the relationships between the formed beams relative to the directions between the modems and access points. However, the directions depend on the relative spatial relationships between the wireless modems and the access points. For example, if the rearward directed access point 1101 is further from the track, a formation of a beam in a more sideways direction is required earlier by the forward directed modem 111 and if the beam direction interval is limited, this may result in an earlier link failure. Adapting the expiry time according to the spatial relationship may accordingly provide improved adaptation and performance in many scenarios.

In some embodiments, the vehicle 103 may be able to travel along different predetermined routes served by the same access points. For example, a train may travel along different tracks. In some embodiments, the link manager 1001 may be arranged to determine which of a set of predetermined routes the vehicle 103 is travelling along and may adapt the expiry time in response to which predetermined route out of the set of predetermined routes that the vehicle 103 is moving along. The different predetermined routes may typically result in different spatial relationships (such as a different minimum distance) between the wireless modems and the access points, and adapting the expiry time based on the selected predetermined route may result in improved performance.

In the previous examples, the initialization of a new rearward link corresponded to an initialization of a search/scan with the most suitable access point being selected. The approach may correspond to using the same approach for initializing a new link as is used in other situations.

However, in some embodiments, the link manager 1001 may be arranged to select the new access point as one which is linked/associated with the rearward directed access point 1101. Specifically, the link manager 1001 may be arranged to select the access point for the new rearward link as an access point that is substantially co-located with the access point for which the link failure is detected. Typically, the two access points may have beams formed in different/opposite directions e.g. along a predetermined route.

Thus, in the specific example, the link manager 1001 may directly select the forward directed access point 1105 as the candidate access point for the new rearward link. Thus, the rearward directed modem 701 may not perform a scan and form a link/association to the access point that indicates the best quality but may directly form the link to a specific access point.

The rearward directed modem 701 may potentially still perform a scan and detect potential suitable access points that can support a link to the rearward directed modem 701. However, it may further select the access point which is linked to the rearward directed access point 1101 even if this is not the access point that the scan indicates is currently likely to provide the best link quality.

The link manager 1001 may in different embodiments use different approaches for determining which access points are linked. For example, in some embodiments, the link manager 1001 may be provided with semi-permanently stored data that defines which access points are co-located. In other embodiments, all access points may in addition to transmitting their own identifier also transmit an identifier for co-located access points. The link manager 1001 may accordingly select the access point for which an identifier was received from the rearward directed access point 1101. As yet another example, in some embodiments, the access points may transmit location information indicating their position and the link manager 1001 may compare location information for the different access points detected by the scan and select the access point for which the location data indicates that it is colocated with the rearward directed access point 1101.

If the scan does not detect an access point corresponding to a linked access point, the rearward directed modem 701 may proceed to establish a new link to another access point.

Any approach for establishing a link to an access point may be used when setting up a new link by the forward directed modem 111 or the rearward directed modem 701. For example, the wireless modem may transmit a link establishment request on a request channel for the selected access point and thus may initialize a link establishment process.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. A claim indicated to be dependent on one claim may also be dependent on all other claims. Specifically, a claim being defined as being dependent on claim 1 may be dependent on all previous claims, and specifically a reference to "claim 1" may be replaced by a reference to "any previous claim". Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example and shall not be construed as limiting the scope of the claims in any way.

We claim:

1. A communication system for supporting communication between an end node of a vehicle and a remote correspondent node via a fixed network, the communication system comprising:
    each wireless access point of a plurality of wireless access points of the fixed network, arrange with a directional antenna arrangement for mm wave radio communication using directional beams;
    a plurality of wireless modems arranged to establish mm wave radio communication links to at least one wireless access points of the plurality of wireless access points, the mm wave radio communication links supporting a data session between the end node and the remote correspondent node, wherein the plurality of wireless modems being located on the vehicle and employing electronically steerable beamforming directional antennas for establishing the mm wave radio communication links;
    a first wireless modem of the plurality of wireless modems is arranged to establish a first mm wave radio communication link to a first access point of the plurality of access points using a first main beam being directed in a forward direction for the vehicle;
    a second wireless modem of the plurality of wireless modems is arranged to establish a second mm wave radio communication link to a second access point of the plurality of access points using a second main beam being directed in a rearward direction for the vehicle;
    a link manager arranged to terminate the second mm wave radio communication link in response to a link failure for first mm wave radio communication link, and to initialize setup of a third mm wave radio communication link between the second wireless modem and a candidate access point in response to the termination of the second mm wave radio communication link.

2. The communication system of claim 1, wherein the link manager is arranged to initialize the third mm wave radio communication link by initializing a scanning for access points by the second wireless modem.

3. The communication system of claim 1, wherein the link manager is arranged to select the candidate access point as an access point linked to the first access point.

4. The communication system of claim 1, wherein the candidate access point is colocated with the first access point.

5. The communication system of claim 4, wherein the candidate access point and the first access point are arranged to form directional beams in different directions.

6. The communication system of claim 1, wherein the candidate access point is a different access point than the first access point and the second access point.

7. The communication system of claim 1, wherein the link manager is arranged to start a timer on detection of the link failure and to terminate the second mm wave radio communication link when the timer exceeds an expiry time.

8. The communication system of claim 7, wherein the link management is arranged to stop the timer in response to a detection that a link between the first wireless modem and the first access point is re-established.

9. The communication system of claim 7, wherein the expiry time is no less than 5 msec and no more than 10 seconds.

10. The communication system of claim 7, wherein the link manager is arranged to adapt the expiry time in response to a speed indication for the vehicle.

11. The communication system of claim 7, wherein the link manager is arranged to adapt the expiry time in response to at least one of a beam property for the electronically steerable beamforming directional antennas of the second wireless modem and a beam property for the electronically steerable beamforming directional antennas of the first wireless modem.

12. The communication system of claim 7, wherein the link manager is arranged to adapt the expiry time in response to at least one of a beam property for the directional antenna arrangement of the first access point and a beam property for the directional antenna arrangement of the candidate access point.

13. The communication system of claim 7, wherein the link manager 1001 is arranged to adapt the expiry time in response to a spatial relationship between the first access point and a predetermined route for the vehicle.

14. The communication system of claim 1, wherein an electronically steerable beamforming directional antenna of the first wireless modem is restricted to forming a beam within an angular interval not exceeding 180 degrees.

15. The communication system of claim 1, wherein the vehicle is arranged to move along a predetermined route.

16. A method of operation for a communication system for supporting communication between an end node of a vehicle and a remote correspondent node via a fixed network, the method comprising:
arranging, by each wireless access point of a plurality of wireless access points of the fixed network, with a directional antenna arrangement for mm wave radio communication using directional beams;
establishing, by a plurality of wireless modems, mm wave radio communication links to at least one wireless access points of the plurality of wireless access points, the mm wave radio communication links supporting a data session between the end node and the remote correspondent node, wherein the plurality of wireless modems being located on the vehicle and employing electronically steerable beamforming directional antennas for establishing the mm wave radio communication links;
establishing, by a first wireless modem of the plurality of wireless modems, a first mm wave radio communication link to a first access point of the plurality of access points using a first main beam being directed in a forward direction for the vehicle;
establishing, by a second wireless modem of the plurality of wireless modems, a second mm wave radio communication link to a second access point of the plurality of access points using a second main beam being directed in a rearward direction for the vehicle; and
terminating, by a link manager, the second mm wave radio communication link in response to a link failure for first mm wave radio communication link, and
initializing, by the link manager, setup of a third mm wave radio communication link between the second wireless modem and a candidate access point in response to the termination of the second mm wave radio communication link.

17. An apparatus for a communication system for supporting communication between an end node of a vehicle and a remote correspondent node via a fixed network, the apparatus comprising:
each wireless access point of a plurality of wireless access points of the fixed network, arrange with a directional antenna arrangement for mm wave radio communication using directional beams;
a plurality of wireless modems arranged to establish mm wave radio communication links to at least one wireless access points of the plurality of wireless access points, the mm wave radio communication links supporting a data session between the end node and the remote correspondent node, wherein the plurality of wireless modems being located on the vehicle and employing electronically steerable beamforming directional antennas for establishing the mm wave radio communication links;
a first wireless modem of the plurality of wireless modems is arranged to establish a first mm wave radio communication link to a first access point of the plurality of access points using a first main beam being directed in a forward direction for the vehicle;
a second wireless modem of the plurality of wireless modems is arranged to establish a second mm wave radio communication link to a second access point of the plurality of access points using a second main beam being directed in a rearward direction for the vehicle;
a link manager arranged to terminate the second mm wave radio communication link in response to a link failure for first mm wave radio communication link, and to initialize setup of a third mm wave radio communication link between the second wireless modem and a candidate access point in response to the termination of the second mm wave radio communication link.

* * * * *